United States Patent [19]

Gabriel

[11] Patent Number: 4,533,030

[45] Date of Patent: Aug. 6, 1985

[54] CLUTCH ACTUATING SYSTEM

[76] Inventor: Albert L. Gabriel, 13853 Charlan Rd., Valley Center, Calif. 92082

[21] Appl. No.: 341,801

[22] Filed: Jan. 22, 1982

[51] Int. Cl.$^3$ .............................................. B60K 41/28
[52] U.S. Cl. ............................ 192/0.052; 192/0.092; 192/3.58; 192/3.59; 200/61.88
[58] Field of Search ............... 192/0.075, 0.076, 0.092, 192/0.096, 3.57, 3.59, 52, 85 R, 85 C, 85 V, 12 C, 109 F, 0.052, 3.58; 74/473 R, 491; 200/61.88

[56] References Cited

U.S. PATENT DOCUMENTS

| | | | |
|---|---|---|---|
| 2,149,044 | 2/1939 | Clouse | 192/85 R |
| 2,214,201 | 9/1940 | Moulder | 192/85 R |
| 3,322,248 | 5/1967 | Kaptur et al. | 192/3.58 |
| 4,061,217 | 12/1977 | Toyota et al. | 192/0.076 |
| 4,091,902 | 5/1978 | Hamada | 192/0.076 |
| 4,144,424 | 3/1979 | Takeda et al. | 200/61.88 |
| 4,344,514 | 8/1982 | Fujihara et al. | 192/3.58 |

*Primary Examiner*—George H. Krizmanich
*Attorney, Agent, or Firm*—Albert L. Gabriel

[57] ABSTRACT

A system for actuating a normally engaged clutch of a manual transmission type vehicle in which clutch re-engagement is sequenced in a plurality of steps or stages. A source of a first pressure level is employed to operate a clutch servo, and a clutch re-engagement control chamber having a second pressure level therein is employed in the stepped clutch re-engagement cycle. A solenoid valve, when energized, connects the source of the first pressure level to the servo to operate the servo and disengage the clutch, and at this time isolates the re-engagement control chamber from the servo. Then upon de-energization of the solenoid valve the source of first pressure level is isolated from the servo and the control chamber is substantially simultaneously connected to the servo so as to allow partial release of the first pressure level from the servo and thereby effect a first stage of clutch re-engagement. The servo is vented to atmosphere by a throttle-controlled valve and preferably also by a bleed orifice to allow complete release of the first pressure level from the servo and thereby allow the clutch to become fully re-engaged, and preferably the added volume of the control chamber is also simultaneously bled to atmospheric pressure to make the final clutch re-engagement stage more controllable and less critical. Preferably, the solenoid valve is energized and de-energized by a throttle-controlled switch to make clutch actuation fully automatic. Alternatively the solenoid may be energized by a novel gear-shift knob tilt switch forming a part of the present invention.

41 Claims, 21 Drawing Figures

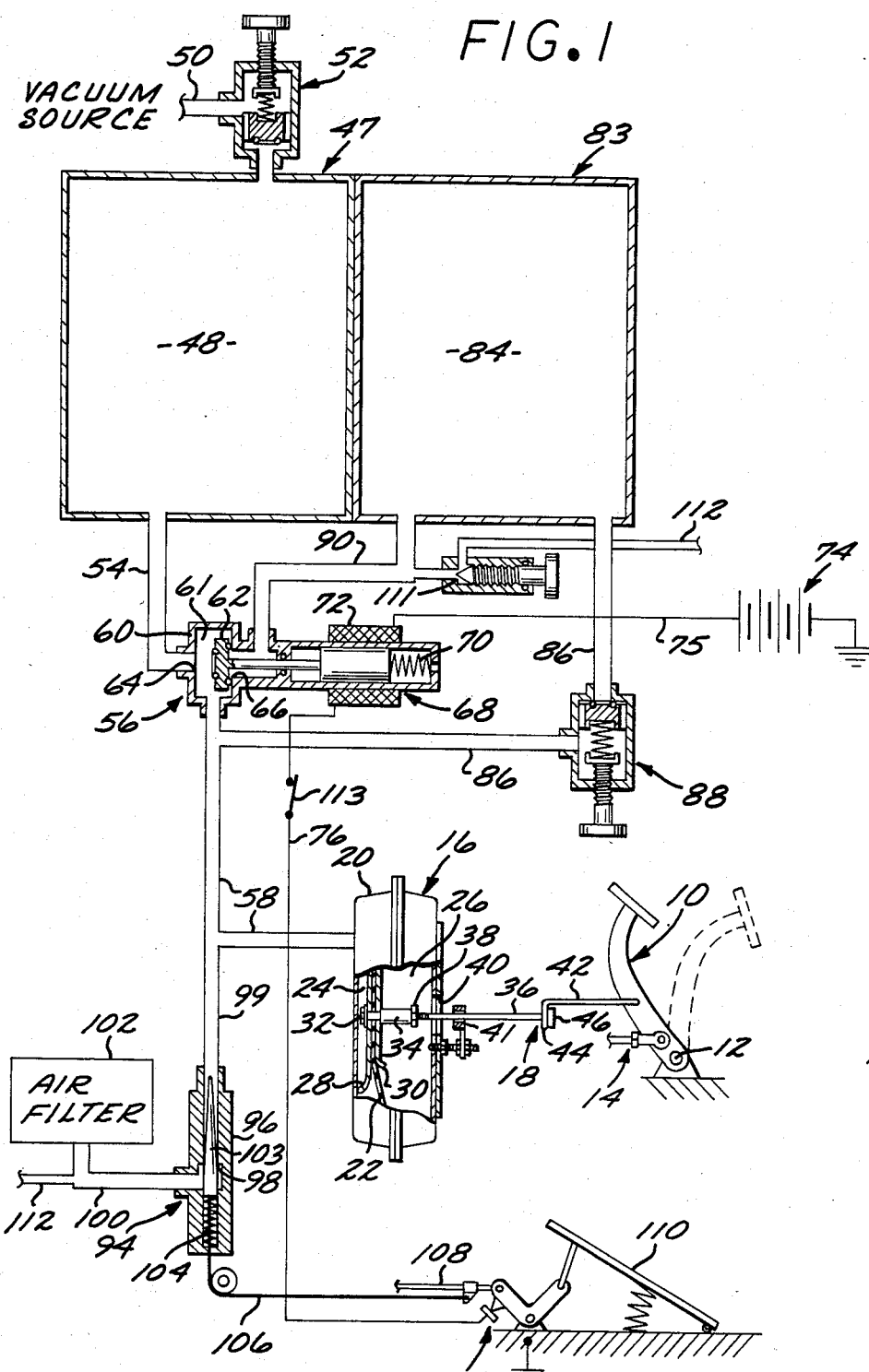
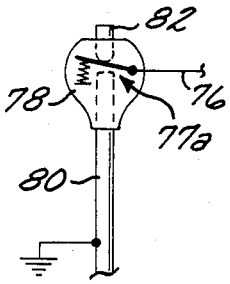
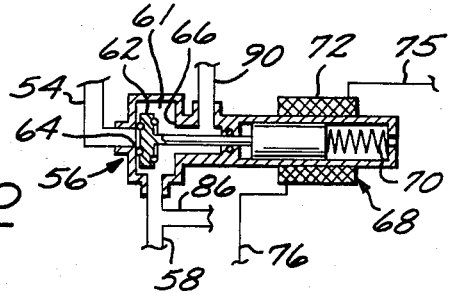
FIG. 1
FIG. 1A
FIG. 2

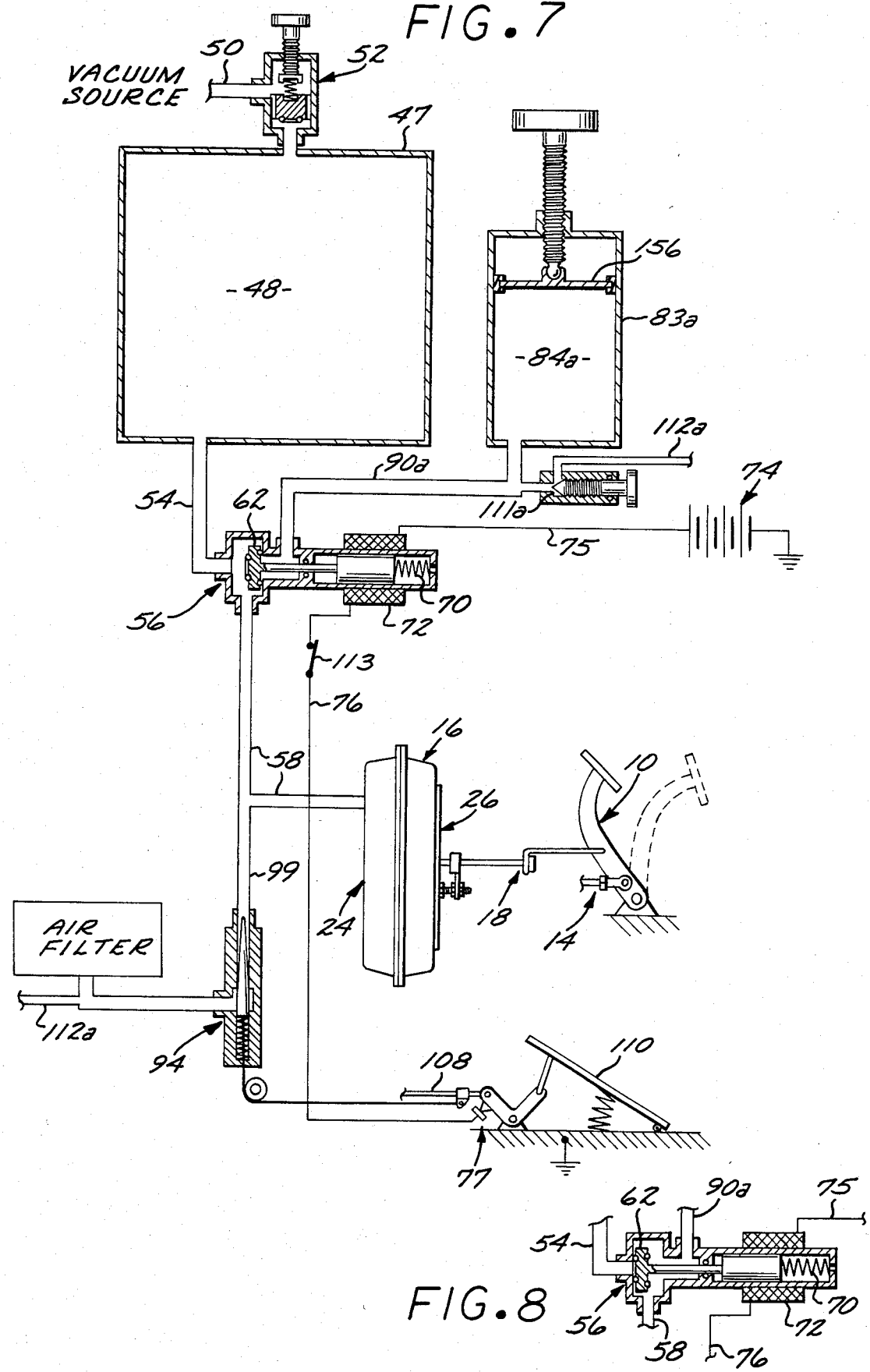

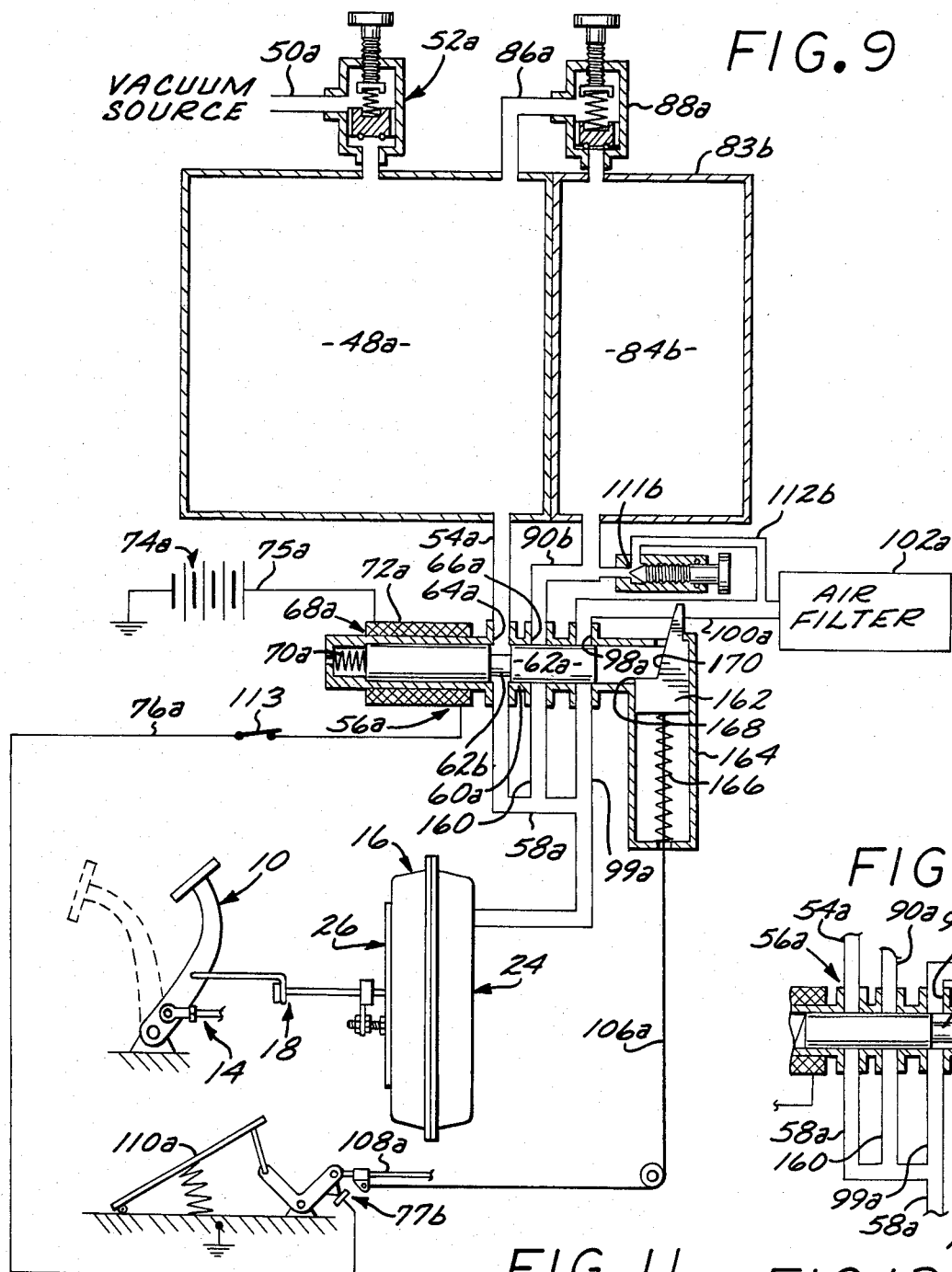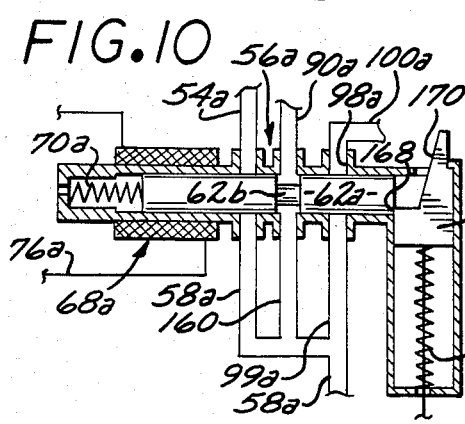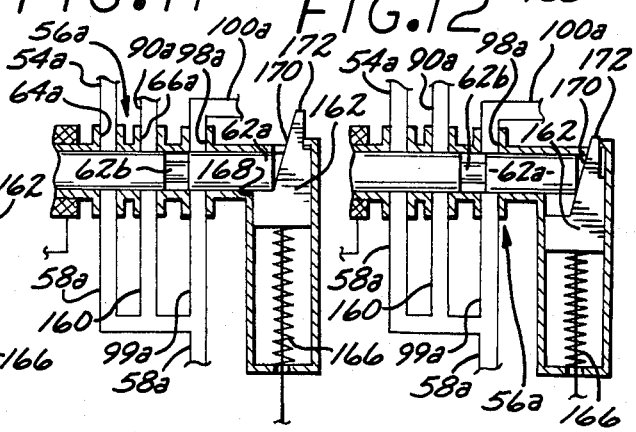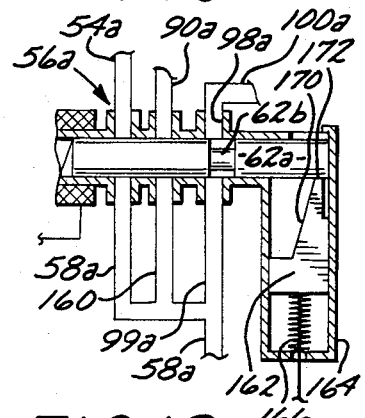

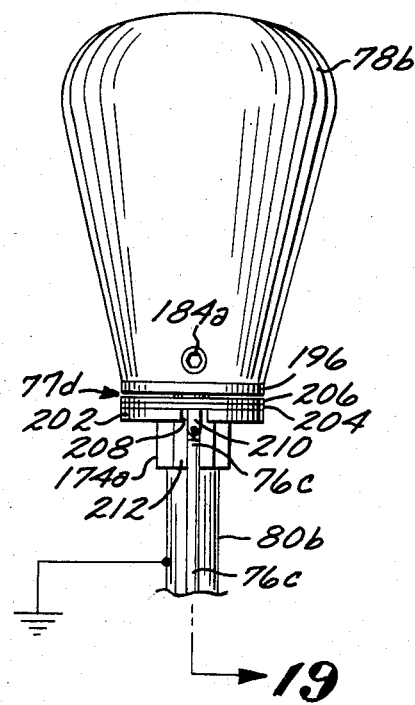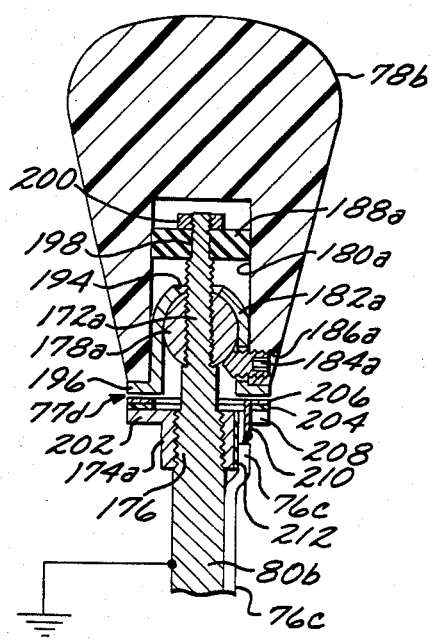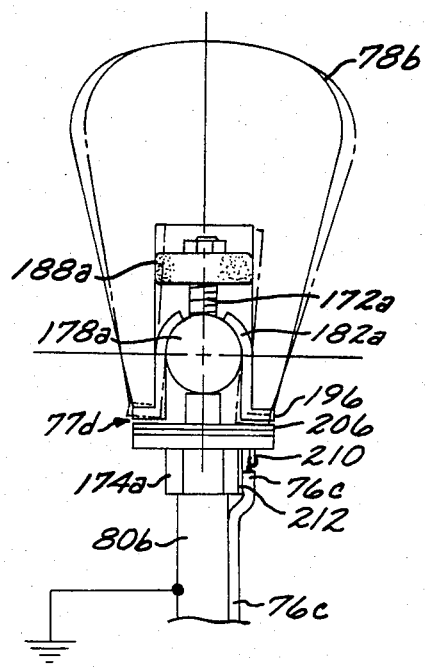

CLUTCH ACTUATING SYSTEM

BACKGROUND OF THE INVENTION

1. Field of the Invention

The present invention relates to a power clutch actuating system for vehicles having a change-speed transmission and a clutch in the drive train, and it relates more particularly to a system for sequencing clutch re-engagement in a plurality of discrete steps or stages.

2. Description of the Prior Art

There have been numerous attempts since the 1930's to provide a satisfactory system for servomotor actuation of the clutch of a manual transmission type vehicle, as evidenced by the large number of U.S. Letters Patent that have issued on systems of this general type. Most of these systems power the servo with an air pressure differential developed between atmospheric pressure and vacuum that is available in the intake manifold, or the carburetor throat below the throttle valve, of the engine of a gasoline powered vehicle.

Currently, due to very high and still increasing fuel costs, there is mass return to manual transmissions, generally in small automobiles, because of a considerably greater torque transmitting efficiency of manual transmissions than current state-of-the-art automatic transmissions. There has been a recent increase in the amount of U.S. patent art in this field, and this recent U.S. patent art indicates that at least one major Japanese automobile manufacturer which has large sales in the United States has for several years been expending a considerable amount of developmental effort seeking to achieve a satisfactory clutch actuating system.

The extensive relevant U.S. patent art discloses that the principal problem that those working in this art have had to overcome has been the difficulty of achieving smooth clutch re-engagement that is properly coordinated with torque demands on the vehicle drive train, this problem being most critical for clutch re-engagement when the vehicle is being accelerated from a standstill, at which time torque demands are generally at the highest and most variable levels. Numerous solutions have been proposed for solving this problem, most of them employing a plurality of steps or stages in the clutch re-engagement cycle, in which the clutch is allowed in a first step or stage to move from its fully disengaged position through a disengagement displacement range to a position near where first clutch contact is made; and then is allowed in one or more further steps or stages to move through a partial torque transfer range to its fully engaged position. However, prior to the present invention all such proposals for effecting clutch re-engagement in successive steps or stages have been undesirably complicated and critical not only as to performance but also as to installation and adjustment, requiring multiple solenoids, complex interrelated valves, valves that are at least partially controlled by vacuum sensed at some point in the carburetor throat, valves that are partially controlled by associated secondary servomotors, and the like.

Because of the difficulty and complexity of such prior art proposals seeking to obtain smooth, properly coordinated clutch re-engagement, particularly where the vehicle is starting up from a standstill, some of the prior art systems have simply included a torque converter or centrifugal clutch in the system to ease in the initial torque transfer through the drive train. An example of such a system that includes a torque converter is the Volkswagen "Automatic Stick Shift" system which it is believed came onto the market in the late 1960's, and appears to embody both the torque converter arrangement disclosed in the Binder U.S. Pat. No. 2,891,640 and the complex multiple interrelated valve system disclosed in the Von Bomhard U.S. Pat. No. 2,974,765. Examples of such systems that include centrifugal clutches are the Binder U.S. Pat. No. 2,766,862 and Von Bomhard U.S. Pat. No. 2,949,174. These centrifugal clutch systems are additionally complicated by mechanisms for advancing the throttle or richening the fuel mixture to keep the centrifugal clutch engaged when the servo clutch actuator is operated for shifting between gears while the vehicle is in motion. The addition of a torque converter or centrifugal clutch in connection with a servo clutch actuator mechanism makes the overall system undesirably expensive and has the limitation that it can only be employed as original equipment, and can not be retrofitted to the large market of already existing vehicles.

In the prior art clutch actuating systems which release the clutch back into engagement in a plurality of discrete steps or stages after the clutch has been disengaged by servo actuation, it has been the mechanisms for effecting the first stage of the clutch re-engagement cycle that have made the systems over-complicated and critical in adjustment and performance.

While the prior art discloses relatively simple means such as a small bleed orifice or a throttle-controlled bleed valve providing communication between the servo actuating chamber and atmospheric pressure for effecting the final stage of the clutch re-engagement cycle during which the clutch is allowed to move from the first stage position to the full clutch engagement position, such bleeding of atmospheric pressure to the servo chamber was nevertheless critical due to the small volume of the servo actuating chamber, and the correspondingly small amount of air involved in the bleeding process relative to the considerable amount of clutch movement sought to be controlled thereby.

The prior art systems for effecting the first step or stage of a multiple stage clutch re-engagement cycle fall into four distinct categories: (1) Multiple, cooperating valve mechanisms, including a solenoid valve which first closes off communication between a high vacuum (or in one case pressure) source and a servo which had been actuated thereby, and another valve, in some cases solenoid-actuated, then proceeds to establish a lower vacuum (or pressure) condition in the servo to effect the first stage of the clutch re-engagement cycle. (2) A double-acting sort of piston or diaphragm clutch actuator employing a complex arrangement of solenoids and valves in which release of vacuum from one side of the piston or diaphragm initiates the first stage of the clutch re-engagement cycle, and pressure buildup on the other side of the piston or diaphragm stops the latter at the first stage position. (3) Employment of a further vacuum servo motor device in addition to the clutch actuating servo, the additional servo cooperating with the primary servo or with a control valve to effect the first stage of the clutch re-engagement cycle. (4) A complex, critical rotary valve associated with the servo actuator solenoid valve provided with multiple porting to effect a two-stage clutch re-engagement cycle through linkage with the throttle.

In all four categories the first clutch re-engagement stage, just as the final stage, was made critical as to adjustment and performance due to the relatively small volume, only approximately that of the servo actuating chamber, being adjusted as to vacuum or pressure level in effecting the first re-engagement stage.

The following U.S. Letters Patent fall within the first category referred to above: Haubourdin et al, U.S. Pat. No. 2,763,347, in which a first solenoid valve shuts off a high vacuum source from the servo, and second solenoid is switched on by clutch movement to define the first stage of the re-engagement cycle; and Von Bomhard U.S. Pat. No. 2,974,765 which discloses the multiple valve mechanism employed in the aforesaid Volkswagen "Automatic Stick Shift" system. Here, after the main solenoid valve was de-energized to cut off communication from a high vacuum source to the clutch servo, a pressure regulator valve commenced operating to bleed atmospheric pressure to the servo to establish a lower vacuum condition in the servo. A separate diaphragm vacuum-actuated servo connected to the pressure regulator valve adjusted the low vacuum level at which the regulator valve stopped admitting atmospheric air in accordance with carburetor throat pressure conditions above the throttle butterfly valve. When this multiple valve mechanism of Von Bomhard U.S. Pat. No. 2,974,765 was employed in practice in the Volkswagen "Automatic Stick Shift" system, it also required the presence of a torque converter in the drive train.

Continuing with the aforesaid first category U.S. patents, Toyota et al U.S. Pat. No. 4,061,217 employs an "air-on" solenoid valve that is switched on by the clutch servo actuator rod so as to be open to apply a gulp of air to the servo when the main solenoid valve cuts off the vacuum source from the servo; then, when the servo actuator rod has moved part way through its stroke, it opens the "air-on" solenoid switch to shut off the atmospheric air and define the first re-engagement stage. Matsumoto et al U.S. Pat. No. 4,248,333 employs the same system as Toyota et al U.S. Pat. No. 4,061,217, in a different structural arrangement. Toyota et al U.S. Pat. No. 4,234,066 employs what is basically the same system of Toyota et al U.S. Pat. No. 4,061,217 and Matsumoto et al U.S. Pat. No. 4,248,333, except that the separate "air-on" solenoid valve is de-energized to define the first stage of the re-engagement cycle by decay in an electrical timing circuit. Michell et al U.S. Pat. No. 3,074,524 discloses an air pressure clutch servo system in which clutch re-engagement is initiated by de-energization of a clutch actuator solenoid valve, and a separate "clutch apply" valve controls the rate of release of air pressure according to engine RPM as indicated by engine water pump output.

The complexity appears to have arisen in this first category of prior art clutch re-engagement patents because they all require some secondary valve means that must be initiated into operation in sequence to establish the low vacuum condition for the first stage of the re-engagement cycle after the primary solenoid valve has been released to cut off the high vacuum source from the servo.

Referring now to the second category of systems for effecting the first stage of clutch re-engagement, in which pressure buildup on the back side of the servo actuator piston or diaphragm stops the clutch at the first stage position, Thomas U.S. Pat. No. 2,531,711 requires two solenoid valves and a clutch actuator stem valve; Hruska U.S. Pat. No. 2,296,282 requires a complex multiple valve arrangement including a solenoid valve, multiple chambers connected by bleed ports at the back side of the servo diaphragm, a check valve to admit air into such chambers, a first stage pressure regulator valve which functions after the solenoid valve is released to establish the first stage servo diaphragm opposition pressure; and this system also requires a fluid clutch in addition to the friction clutch. The second category of patents also includes Price et al U.S. Pat. No. 2,057,740 which employs a solenoid valve, a check valve to admit air into a chamber at the back side of a double-ended clutch servomotor, and an actuator stem slide valve which starts pressure accumulating on the back side of the servo for the first stage positioning; and Fujimoto et al U.S. Pat. No. 3,303,912 which requires a solenoid valve, a complex slide valve associated with a pressure chamber at the back side of the actuator diaphragm, and a separate servo controlled by carburetor throat vacuum to adjust the slide valve.

The third category of patents referred to above which require an additional servomotor device to control the first stage of clutch re-engagement includes Price U.S. Pat. No. 2,511,373, Von Bomhard U.S. Pat. No. 2,974,765 also referred to under category one above, Prather U.S. Pat. No. 2,665,785, Flinn U.S. Pat. No. 2,620,667, and Fujimoto et al. U.S. Pat. No. 3,303,912 referred to also under category two above.

The fourth category of patents referred to above includes Grassmuck U.S. Pat. No. 3,698,525, which includes in addition to a solenoid valve a related rotary valve with multiple porting, the rotary valve being critically mechanically linked to the throttle in an attempt to accomplish stepped or staged clutch re-engagement entirely through the throttle connection.

Another problem in this art is the provision of a durable, reliable, conveniently operable switch mechanism which when closed will energize the solenoid actuated valve to cause servo disengagement of the clutch, and which when again opened will initiate the first stage of the clutch re-engagement cycle. In most of the prior systems of this general type, the switch mechanism took one of three forms, (1) a switch in the gearshift knob actuated by push button on the top of the knob; (2) a switch associated with the gearshift lever proximate its root and arranged to close upon application of shifting force to the lever; and (3) a switch associated with the throttle and arranged to close upon closing of the throttle. Of these three forms, the throttle-controlled switch is presently preferred because it is the most reliable way to render the system fully automatic insofar as the clutch actuation part of gear shifting is concerned, and it also results in a considerable saving of fuel because of resulting free wheeling when there is no torque demand on the drive train. A simple system disconnect switch conveniently mounted, as on the vehicle dashboard, can then enable engine compression to be used for deceleration whenever desired.

Two recent U.S. Letters Patent disclose gearshift lever knob tilt switches in which the knob is pivotally mounted at its root on the upper end of the gearshift lever, and has its largest diameter, most bulbous portion at the upper end so that application of shifting force to the upper part of the knob will tilt the knob and close the switch, and release of such force will allow spring biasing means in the knob to reopen the switch. These two recent patents are Takeda et al U.S. Pat. No. 4,144,424 and Rumyantsev et al U.S. Pat. No. 4,183,424. Except for the throttle-controlled switch, the tiltable knob type switch is believed to be the most conveniently operable type of switch for clutch actuating systems of the general type referred to herein. However, the specific knob switches disclosed in the Takeda et al and Rumyantsev et al patents present problems. Each of them requires a special type of gearshift lever for mounting of the switch or conducting a hot lead therethrough, which precludes retrofitting of these two knob switches on the large market of existing automobiles. The pivotal mounting in the Takeda et al device precludes universal tilting and requires a non-rotatable gearshift lever; while the Rumyantsev et al tilting is not about a pivot structure, but is simply against a shoulder at the opposite side of the lever from the side to which the shifting force is applied, so pivoting is not as efficient as it would be with an axially centered pivot. Metal springs for centering the knobs and opening the switches in these two patents do not exert their primary force in the lateral direction required to center the knobs and open the switches; to the contrary, the springs in each of these patents exert their primary biasing force in an axial direction 90% offset from the required biasing result, and consequently are inefficent in their biasing action. Additionally, the devices of each of these two patents are undesirably complicated.

Another type of gearshift lever knob tilt switch is disclosed in Barth U.S. Pat. No. 3,061,058, in which the gearshift knob is split into upper and lower halves which bear the respective contacts, and the lower half is pivotal so that by placing the hand over the upper half and engaging fingers into the lower half, the lower half can be rocked up into the contacting position. This requires an unnatural grasping of the knob.

SUMMARY OF THE INVENTION

The large number of actuating systems disclosed in the prior patent art since the 1930's, all of them undesirably complex and inherently critical in adjustment and operation, indicates a long-felt need for a simpler, less expensive and less critical clutch actuating system. It is a general object of the present invention to fulfill this need.

Another object of the invention is to provide a stepped or staged clutch re-engagement cycle in a pressure differential-operated servo clutch actuating system, wherein a first step or stage of the re-engagement cycle is effected by dumping a closed pressure differential chamber of the servo into communication with a clutch re-engagement control chamber which has a pre-established pressure level therein that is different than the actuating pressure level in the servo chamber.

Another object is to provide a pressure differential-operated servo clutch actuating system having a stepped or staged clutch re-engagement cycle, wherein a control chamber having a pre-established pressure level therein that is communicated with a servo chamber to effect the first stage of the cycle provides a greatly added volume to the servo chamber volume, such larger volume making the establishment of the pre-established pressure and operation of the first step or stage of the clutch re-engagement cycle generally uncritical in both adjustment and operation, and so that bleeding of the combined volumes to atmospheric pressure to effect a second step or stage of the re-engagement cycle is rendered more controllable and less critical than in prior art systems where only substantially the volume of the servo chamber is bled to atmospheric pressure in the second stage.

It is another object of the invention to provide a clutch actuating system of the character described wherein the said servo and control chambers are bled to atmospheric pressure to effect the second stage of the clutch re-engagement cycle partly by means of a throttle-controlled bleed valve so as to coordinate clutch re-engagement with torque demands of a vehicle, and simultaneously partly by means of an atmospheric pressure bleed orifice in communication with the control chamber. The bleed orifice cooperates with the throttle-controlled bleed valve to improve smoothness of the second re-engagement stage, and also assures against inadvertent accumulation in the control chamber of a pressure level different than atmospheric pressure (vacuum in a vacuum system, or pressure in a pressure system) after the servo and control chambers have been fully bled to atmospheric pressure at the end of the clutch re-engagement cycle. It also completes the clutch re-engagement cycle for downhill engine compression braking if a system-disconnect manual switch is employed to override a throttle-controlled switch that might otherwise energize the system to disengage the clutch in a downhill situation.

A further object of the invention is to provide a novel knob tilt switch for a clutch actuating system of the character described which is simpler and more positive in action than prior art knob tilt switches, and which is particularly suitable for retrofitting in existing vehicles.

According to the invention, a high vacuum (or alternatively pressure) source is placed in communication with a servo vacuum (or pressure) chamber to actuate a clutch of a manual transmission type vehicle to its fully disengaged position by closing an electrical circuit to energize a solenoid-actuated valve. Preferably, the electrical circuit is closed by means of a throttle-controlled switch that closes upon release of the throttle to its closed position. Opening of the switch at the first increment of throttle displacement, and consequent de-energization of the solenoid valve, closes off communication between the high vacuum (or pressure) source and the servo chamber, and places the servo chamber into communication with a clutch re-engagement control chamber having a lower vacuum (or pressure) level previously established therein, equalization of the pressure levels between the servo and control chambers reducing the servo actuating force to effect a first stage of the clutch re-engagement cycle which places the clutch at approximately its position of first clutch plate contact. A second stage of the clutch re-engagement cycle in which the clutch is gradually brought to its full engagement position of 100% torque transfer capability is then effected by bleeding both the servo chamber and the control chamber to atmospheric pressure. A throttle-controlled bleed valve coordinates this second re-engagement stage with vehicle torque demands, and an atmospheric pressure bleed orifice, which is preferably adjustable, associated with the control chamber cooperates with the throttle-controlled valve to provide optimum smoothness in the second re-engagement stage. This atmospheric pressure bleed orifice also positively assures against any inadvertent buildup of vacuum (or pressure) in the control chamber after it has been fully bled or vented to atmospheric pressure at the end of the second clutch re-engagement stage. Such inadvertent vacuum (or pressure) buildup might possibly be caused by a faulty valve seal in the system, and could, unless vented as indicated, conceivably cause actuation of the servo. The bleed orifice also automatically completes the clutch re-engagement cycle in the event the system is manually switched off to obtain downhill braking by engine compression.

In one form of the invention, a low vacuum (or pressure) is established in the control chamber by communication with the high vacuum (or pressure) servo actuating source through the solenoid valve and a pressure regulator valve when the servo is actuated; and then the control chamber is placed into communication with the servo chamber through the solenoid valve when the solenoid is de-energized, the resulting reduced vacuum (or pressure) in the servo chamber effecting the first stage of the clutch re-engagement cycle.

In a second form of the invention the control chamber remains isolated from the high vacuum (or pressure) servo actuating source, and is at atmospheric pressure while the high vacuum source is connected to the servo chamber through the energized solenoid valve. Then, upon de-energization of the solenoid valve the control chamber is dumped into communication with the servo chamber through the solenoid valve to, in effect, dilute the vacuum (or pressure) in the solenoid chamber and thus effect the first stage of the clutch re-engagement cycle.

In a third form of the invention the control chamber is continuously in communication with the high vacuum (or pressure) source through a pressure regulator valve, and when the solenoid is released from its high vacuum (or pressure) servo actuating position, it shifts to provide communication between the control chamber and the servo to effect the first clutch re-engagement stage. In this form of the invention, instead of a separate throttle-controlled atmospheric pressure bleed valve as is employed in each of the first and second forms, the solenoid valve is ported to move beyond the first re-engagement stage position to a position where it will open porting that will bleed atmospheric pressure to the servo. This atmospheric pressure bleed function of the solenoid valve is coordinated with throttle displacement by a throttle-controlled cam that cooperates with the solenoid valve element as a cam follower.

The gearshift knob tilt switch of the invention employs a simple mounting post adapted for coaxial threaded connection to the free end of a gearshift lever. The post, although simple in configuration, serves the four functions of (1) supporting a pivot ball thereon; (2) supporting a resilient annular ring thereon for centering the knob to the open position of the switch; (3) supporting a "hot" annular contact thereon in insulated relationship therewith, this contact being conveniently located proximate the bottom of the knob for electrical connection to a conductor which may be brought up along the side of the gearshift lever; and (4) serving as a ground conductor from the gearshift lever to the pivot ball. A simply configured downwardly opening conductive cup in the gearshift knob serves the functions of (1) coupling with the pivot ball to complete the knob pivot; (2) providing an annular ground contact proximate its open, base end; and (3) providing ground potential conduction from the pivot ball to the annular ground contact portion of the cup. In one form of the invention, the cup also serves to bear against the outer periphery of the resilient annular centering ring.

In one form of the gearshift knob of the invention the pivot ball is axially located proximate the largest diameter part of the knob so as to require deliberate manual tilting of the knob to close the switch, which is a protection against closing of the switch should the knee or leg of the driver or a passenger rest against the knob. In another form of the knob tilt switch of the invention, the largest diameter part of the knob is near the upper end of the knob, and the pivot ball is located near the lower end of the knob, so that the knob switch will be automatically closed when the driver simply pushes or pulls against the largest diameter part of the knob in the direction of the next gear position.

BRIEF DESCRIPTION OF THE DRAWINGS

These and other objects of the invention will become more apparent in view of the following description in conjunction with the drawings, wherein:

FIG. 1 is a diagrammatic view, partly in section and partly in elevation, illustrating one form of the clutch actuating system of the invention with the solenoid valve thereof energized and the servo actuated to the fully disengaged position of the vehicle clutch;

FIG. 1a is a fragmentary diagrammatic view illustrating a gearshift knob button switch employed in place of the throttle-controlled switch shown in FIG. 1 for controlling energization of the solenoid valve;

FIG. 2 is a fragmentary view taken from FIG. 1, with the solenoid valve in the de-energized position in which the first step or stage of the clutch re-engagement cycle is effected;

FIG. 7 is a view similar to FIG. 1, but illustrating a second form of the clutch actuating system of the invention;

FIG. 8 is a view similar to FIG. 2, showing a portion of the system illustrated in FIG. 7;

FIG. 9 is a view similar to FIGS. 1 and 7, illustrating a third form of the invention;

FIGS. 10–13 are fragmentary views each showing a portion of FIG. 9, and showing successive positions of the solenoid valve during the clutch re-engagement cycle;

FIG. 18 is a side elevational view similar to FIG. 14 but illustrating a second form of knob switch according to the invention;

FIG. 19 is a vertical, axial section taken on the line 19—19 in FIG. 18; and

FIG. 20 is a diagrammatic side elevational view similar to FIG. 16 but illustrating the tilting movement of the knob switch form shown in FIGS. 18 and 19.

DETAILED DESCRIPTION

Figure 3:
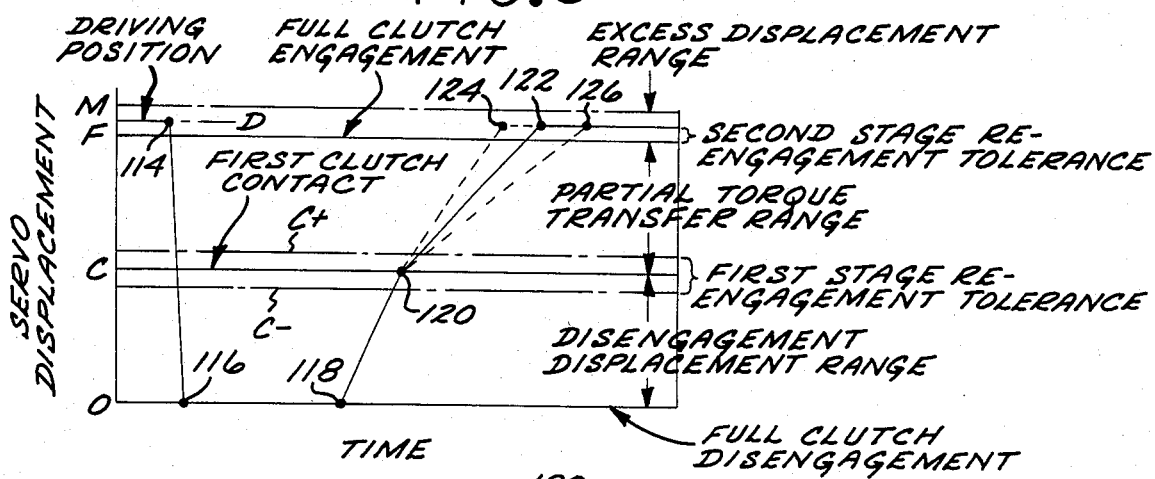
FIG. 3 is a graph diagrammatically illustrating servo actuator rod, and hence vehicle clutch, displacement vs. time for a complete cycle of clutch operation, from the clutch driving position to the fully disengaged clutch position, and then back through first and second steps or stages of the clutch re-engagement cycle.

Referring to the drawings, FIGS. 1 and 2 illustrate a first form of the present invention for providing clutch re-engagement in a plurality of discrete steps or stages.

A clutch pedal lever 10 is mounted on a pivot 12 and is operatively connected through linkage generally designated 14 to a clutch (not shown) associated with a manually operated change-speed transmission. The clutch linkage 14 may be entirely a mechanical linkage or may be partially mechanical and partially hydraulic. Typically, the clutch may be of the conventional dry plate type.

The clutch actuating system of the present invention includes a clutch actuator servo generally designated 16 which is mechanically connected to any conveniently available movable part of the clutch system by means of a lost motion linkage generally designated 18. For convenience of illustration, the clutch actuator linkage 18 is shown pivotally connected directly to the clutch pedal lever 10; however, it is to be understood that the actuator linkage 18 may be connected to other suitable parts of the clutch linkage 14, as for example a clutch actuating lever (not shown) extending directly from the clutch housing, such as that found in the Volkswagen "Rabbit". In FIG. 1 the clutch actuator servo is shown in its fully evacuated, fully actuated position, in which it has moved the clutch pedal lever 10 and linkage 14 to the full disengagement position of the clutch, against the force of the clutch springs which normally bias the clutch to its fully engaged position.

The servo 16 includes a housing 20 which is spanned by an air-tight, elastic diaphragm 22 that divides the inside of housing 20 into a pair of pressure differential chambers 24 and 26. Preferably, the pressure differential for operating the servo 16 is developed by a vacuum source, because such a source is already available in most automotive type vehicles. Such a source may be the intake manifold of a gasoline engine vehicle, or a brake servo vacuum pump in a gasoline or diesel engine vehicle.

The present invention will accordingly be described in detail hereinafter as a vacuum operated system. However, it is to be understood that the invention is not limited to the use of vacuum to operate the clutch actuator servo and to provide for stepped or staged clutch re-engagement, but may alternatively utilize air pressure instead of vacuum for operating the clutch actuator servo and providing for stepped or staged clutch re-engagement. Such use of air pressure may be desirable where an air pressure source is already available on a vehicle, as for example the air pressure source employed in many trucks for operating air brakes. Adaptation of the invention to the use of air pressure will be described in detail hereinafter.

Thus, with the system being vacuum-actuated, the pressure differential chamber 24 is a vacuum chamber and the pressure differential chamber 26 is an atmospheric pressure chamber. Diaphragm 22 has washers 28 and 30 engaged against its opposite sides for connection to the actuator linkage 18. The washers 28 and 30 and diaphragm 22 are clamped between a bolt 32 and elongated adjuster nut 34. Servo actuator rod 36 is threadedly engaged for axial adjustment in the elongated nut 34, and is locked in its adjusted position by means of lock nut 38. Servo actuator rod 36 extends axially out of the servo housing 20 through an opening 40 in servo housing 20, the opening 40 freely venting the atmospheric pressure chamber 26 to atmosphere. An adjustable stop 41 may be mounted on the servo housing 20 to limit the extent of travel of the servo actuator rod 36 in the direction of clutch re-engagement so as to minimize the amount of tolerance in the final stage of clutch re-engagement, so as to in turn minimize the actuating stroke required of the servo 16. This re-engagement tolerance will be described more fully hereinafter in connection with FIG. 3.

The lost motion linkage between the servo 16 and the clutch lever 10 includes the servo actuator rod 36 and another rod 42 that is pivotally connected to the clutch lever 10 and connected at its other end to the rod 36 by means of a lost motion connection which may take the form of a transverse loop 44 on rod 42 slidably engageable over the rod 36 and normally abutted against the underside of a head 46 on the end of actuator rod 36. This lost motion connection enables the clutch lever 10 to be manually depressed without opposition from the servo 16 if the driver wishes to override the clutch actuating system of the present invention.

The clutch actuating system of the invention includes four basic portions: (1) a high vacuum portion for selectively operating the clutch actuator servo 16 to move the clutch to its fully disengaged position, and in the form shown in FIGS. 1 and 2 for partially evacuating or energizing the low vacuum portion of the system; (2) a low vacuum portion operable upon disengagement of the high vacuum portion from the servo to effect a first stage or step of the clutch re-engagement cycle; (3) an electromechanical portion for selectively connecting the high and low vacuum portions of the system to the servo 16; and (4) an atmospheric pressure bleed portion for effecting the second stage or step of the clutch re-engagement cycle, at least part of the atmospheric bleed portion being throttle-connected so as to correlate the second stage with vehicle torque demands.

The high vacuum portion of the system includes a receptacle 47 defining a primary, high vacuum storage chamber 48 connected through a conduit 50 to a suitable vacuum source (not shown) such as the intake manifold of a gasoline engine vehicle, a brake servo vacuum pump for a gasoline or diesel engine vehicle, or the like. A check valve 52 in the vacuum source conduit 50 serves as a vacuum accumulator which enables high vacuum to be retained in the storage chamber 48 during periods of time when the vacuum source is shut down or at a reduced level. Preferably, the check valve 52 is of the adjustable pressure regulator type to permit adjustment of the high vacuum stored in the chamber 48. The high vacuum storage chamber 48 is selectively placed into communication with the vacuum chamber 24 of servo 16 through a high vacuum conduit 54 which leads from storage chamber 48 to a two-position solenoid-actuated valve 56, and through a further conduit 58 which leads from valve 56 to the servo vacuum chamber 24.

The solenoid-actuated valve 56 has a valve body 60 defining a chamber 61 within which a valve element 62 is movable between first and second positions. The high vacuum conduit 54 from high vacuum storage chamber 48 communicates with valve chamber 61 through a high vacuum port 64 at one side of chamber 61; while the low vacuum portion of the system communicates with valve chamber 61 through a low vacuum port 66 at the opposite side of valve chamber 61. Valve element 62 is connected to solenoid actuator 68 for valve 56; and is normally biased by a spring 70 to its first position, shown in FIG. 2, in which the valve element 62 seals off the high vacuum port 64 and opens up the low vacuum port. During energization of the solenoid actuator 68, the valve element 62 is shifted against the biasing force of spring 70 to its second position, shown in FIG. 1, in which it opens up the high vacuum port 64 and seals off the low vacuum port 66. Electrical energy is automatically provided to coil 72 of solenoid actuator 68 from a battery 74 which will normally be the primary battery of a vehicle, such as a 12-volt battery that has one side grounded. The hot side of battery 74 is electrically connected through a conductor 75 to one side of solenoid coil 72, the other side of which is electrically connected through a conductor 75 to one side of solenoid coil 72, the other side of which is electrically connected through a conductor 76 and throttle-controlled switch 77 to ground. The switch 77 is arranged to close so as to energize solenoid coil 72 and thereby actuate the servo 16 and cause clutch disengagement whenever the throttle of the vehicle is at its fully closed position; and conversely, to open so as to de-energize solenoid coil 72 whenever the throttle is displaced from its closed position. Since the throttle is normally automatically released to its closed position each time a gearshifting event is to be accomplished or when the vehicle is at a standstill, the throttle-controlled type switch 77 causes clutch actuation to be completely automatic. An alternative to the throttle-actuated switch 77 is a normally open gearshift knob switch 77a such as that shown in FIG. 1a which is located in gearshift knob 78 on electrically grounded gearshift lever 80. Depression of switch button 82 at the top of knob 78 closes switch 77a, connecting conductor 76 to ground and energizing solenoid valve 56 to actuate servo 16 and disengage the clutch; while release of switch button 82 starts the two-stage clutch re-engagement cycle of the system in motion.

The low vacuum portion of the system includes a receptacle 83 defining a secondary, clutch re-engagement control chamber 84. The low vacuum condition is achieved in low vacuum storage chamber 84 through a conduit 86 that provides communication between low vacuum chamber 84 and the conduit 58 which connects valve chamber 61 to servo vacuum chamber 24. An adjustable pressure regulator check valve 88 in conduit 86 permits adjustment of the low vacuum condition in chamber 84 to the desired level. This "low vacuum" condition in chamber 84 represents an absolute pressure that is higher than the "high vacuum" condition in chamber 48. This preselected level of low vacuum in the low vacuum storage chamber 84 is established immediately upon energization of the solenoid valve 56 from its position of FIG. 2 to its position of FIG. 1 for applying high vacuum to the servo vacuum chamber 24 to fully disengage the clutch. At the same time that the high vacuum is communicated to the servo vacuum chamber 24 from high vacuum storage chamber 48 through conduit 54, high vacuum port 64, valve chamber 61 and servo conduit 58, the high vacuum is also applied from conduit 58 through conduit 86 and pressure regulator check valve 88 to the low vacuum storage chamber 84.

The low vacuum storage chamber 84 communicates through a conduit 90 to the valve chamber 61 through its low vacuum port 66. Such communication is blocked when switch 77 is selectively closed to energize solenoid 68 and shift element 62 to its position of FIG. 1 to apply high vacuum to the servo 16 for full clutch disengagement, and to charge the low vacuum chamber 84 to its low vacuum condition in preparation for the first stage of the clutch re-engagement cycle. Then, instantaneously upon the opening of switch 77 to de-energize solenoid 68, the spring 70 will shift valve element 62 to its first position shown in FIG. 2 in which it shuts off high vacuum communication to the servo 16 and opens up low vacuum port 66 to initiate the first stage or step of the clutch re-engagement cycle by providing communication between the low vacuum storage chamber 84 to servo vacuum chamber 24 through conduit 90, adjustable orifice 92, low vacuum port 66 and chamber 61 of valve 56, and conduit 58.

A high vacuum in the high vacuum storage chamber 48 in the range of from about one-third to about two-thirds of an atmosphere (i.e., a vacuum of from about 10 inches to about 20 inches of mercury) will be available in most automotive systems, and will be more than adequate to provide sufficient servo actuating force for rapidly fully disengaging most automotive clutches when applied at a convenient location in the clutch linkage. For example, if one-third of an atmosphere of vacuum is established in high vacuum chamber 48, and the servo diaphragm 22 has a diameter of approximately 6 inches, then the pressure differential between the servo chambers 26 and 24 would be capable of developing a force at the servo actuator rod 36 of approximately 138 pounds, which would be somewhat reduced by the resistance to flexing in the diaphragm 22, but nevertheless more than adequate.

The pre-established low vacuum level in low vacuum storage chamber 84 is selected so that upon communication of low vacuum chamber 84 with servo chamber 24, and vacuum equalization between the chambers 84 and 24, there will be provided a pressure differential between the servo chambers 26 and 24 that will apply a force from the servo actuator rod 36 through the linkages 18 and 14 to the clutch that will be sufficiently weak to enable the clutch springs to move the clutch from its fully disengaged position through its disengagement displacement range to approximately the initial clutch contacting position; but which force will be sufficiently strong to stop any further clutch engaging movement at approximately the initial clutch contacting position, until the servo vacuum chamber 24 and low vacuum storage chamber 84 are vented to atmosphere during the second stage or step of the clutch re-engagement cycle. The low vacuum level that is pre-established in the low vacuum storage chamber 84 that is required to achieve the desired target for the first stage or step of the clutch re-engagement cycle, namely, to allow the clutch to be moved by its springs to approximately the position of first clutch contact, will vary according to the area of the servo diaphragm, the clutch spring strength, the amount of leverage provided by the linkages 18 and 14, and the clutch adjustment for individual vehicles.

An atmospheric pressure bleed valve generally designated 94 is employed to control the second stage or step of the clutch re-engagement cycle. Valve 94 includes a valve body 96 defining a bleed port 98 which communicates through a conduit 99 and the conduit 58 to the servo vacuum chamber 24. Air at atmospheric pressure is admitted to the valve bleed port 98 through a conduit 100 after passing through a suitable air filter 102 which may be the engine air intake filter. Atmospheric pressure bleed valve 94 is preferably of the "needle valve" type having a valve element 103 biased by a spring 104 to a position in which valve element 103 normally closes the bleed port 98. Valve element 103 is connected through a cable 106 and throttle linkage member 108 to the throttle pedal 110 or other suitable throttle member. This mechanical connection between valve element 103 and throttle member 110 is such that when the vehicle throttle is closed the valve element 103 will close off the valve bleed port 98. After the initial opening movement of the throttle member 110 has caused switch 77 to open and effect the first stage of the clutch re-engagement cycle, further opening movement of the throttle will cause the valve element 103 to be moved proportionally so as to provide a corresponding proportional opening of the air bleed port 98.

During normal operation of the present clutch actuating system, at the time of completion of the first stage or step of the clutch re-engagement cycle which has placed the clutch plates approximately at their initial contacting position, the vehicle throttle member 110, and correspondingly also the atmospheric pressure bleed valve 94, will be just undergoing their initial opening movements. At such time the solenoid valve 56 will have been released to its first or unenergized position of FIG. 2 so that not only is the servo vacuum chamber 24 in communication with bleed valve 94, but also the low vacuum chamber 84 is in communication with bleed valve 94, the latter communication being through conduit 90, port 66 and chamber 61 of the solenoid valve 56, and conduits 58 and 99. Thus, when the atmospheric pressure valve 94 is opened in proportion to throttle displacement to effect the second stage or step of the clutch re-engagement cycle, air at atmospheric pressure is bled through valve 94 to both the servo chamber 24 and the low vacuum chamber 84.

An adjustable atmospheric pressure bleed orifice 111 is in communication with conduit 90 so as to provide a continuous bleeding of atmospheric pressure into the secondary, low vacuum chamber 84. Bleed orifice 111 is provided with clean air from air filter 102 through a conduit 112. Bleed orifice 111 serves several functions: It prevents any possible accumulation of high vacuum in low vacuum chamber 84 in the event of a fault in either solenoid valve 56 or pressure regulator check valve 88. It also provides a gradual second stage clutch re-engagement operation regardless of throttle displacement, and this in turn has, is a prototype of the form of FIGS. 1 and 2, cooperated with the throttle-controlled atmospheric pressure bleed valve 94 to improve the smoothness of the second stage of clutch re-engagement. It further serves to automatically gradually effect the second stage clutch re-engagement if the system is de-energized by opening a normally closed manual switch, such as a dashboard toggle switch 113 wired in series with throttle switch 77, to obtain downhill braking by engine compression. Additionally, it provides for adjustment of the rate of the second stage of clutch re-engagement that is independent of throttle displacement.

While the primary function of the low vacuum chamber 84 is to provide the pre-established low vacuum for the first stage of the clutch re-engagement cycle, the much greater volume which the low vacuum chamber 84 contributes to the servo vacuum chamber 24 during both the first and second clutch re-engagement stages fortuitously makes adjustment and operation of both stages much more controllable and less critical than was the case in prior art systems where a relatively small volume, only approximately that of the servo actuating chamber, was involved in effecting both clutch re-engagement stages.

FIGS. 3-6 graphically illustrate a variety of different modes of operation of the plural vacuum chamber system shown in FIG. 1, the variations in the operation of the system depending upon the setting of adjustable pressure regulator check valve 88 which controls the extent of the first stage of the clutch re-engagement cycle, the setting of adjustable bleed orifice 111 which controls the basic rate of application of the second stage of the clutch re-engagement cycle, the displacement of the throttle, and hence also of the atmospheric pressure bleed valve 94, from their closed positions, and variations in such throttle and bleed valve displacements. In FIGS. 3-6 the ordinates represent displacement of the servo actuator rod from the fully actuated or evacuated position of the servo 16 at the horizontal zero line, which is the fully disengaged position of the clutch, to the position corresponding to the maximum possible movement of the clutch linkage 14 at the phantom line designated M. The abscissas represent the passage of time from an arbitrary zero point selected to be when the servo 16 is in its unactuated, fully relaxed position corresponding to the full enagement position of the clutch, but just momentarily before a complete clutch actuation cycle is to commence. The central horizontal solid line C represents the partially relaxed position of the servo 16 at which the clutch plates first make contact during the clutch re-engagement cycle; while the upper horizontal solid line F represents the almost fully relaxed position of the servo 16 at which the clutch plates have become fully engaged so as to provide 100% torque transfer efficiency from the engine through the clutch to the transmission.

Starting at the zero position of full clutch disengagement, the clutch remains disengaged during the initial servo relaxation movement from the zero position to the first contact position C, this range of movement being referred to herein as the "clutch disengagement displacement range". The clutch plates are then in partial, slipping engagement during further servo relaxation movement from the first contact position C to the full engagement position F, this range of movement being referred to herein as the "partial torque transfer range."

The target for the first stage or step of the clutch re-engagement cycle that is initiated by the opening of switch 77 and controlled by the low vacuum chamber 84 is for the servo 16 to move to and stop at the first clutch contact position C. Thus, it is the target for the level of low vacuum in chamber 84 to be such that upon communication of low vacuum chamber 84 with servo vacuum chamber 24 the servo 16 will be enabled to be moved by the clutch springs through the linkages 14 and 18 to approximately the initial clutch contacting position represented by the line C. However, the clutch actuating system of the invention will operate satisfactorily if the first stage or step of the re-engagement cycle places the servo 16 within a first stage re-engagement tolerance span or range that is between a slightly disengaged position of the clutch represented by the phantom line C— in which there is zero torque transfer through the clutch, and a slightly engaged position of the clutch represented by the phantom line c+ in which there is minimum torque transfer through the clutch.

The target for the second stage or step of the clutch re-engagement cycle, which is initiated by gradual bleed-in of atmospheric pressure through adjustable bleed orifice 111 to low vacuum chamber 84 and by throttle movement and consequent progressive opening of the atmospheric pressure bleed valve 94, is to go through the partial torque transfer range between first clutch contact position C and full clutch engagement position F, and then slightly beyond position F to a driving position D so as to provide some second stage re-engagement tolerance for assurance against clutch slippage under heavy driving torque loads.

Referring to FIG. 3, the solid line curve represents a complete clutch actuation cycle moving from left to right from the zero time position starting at the driving position D, moving all the way down to the zero full clutch disengagement position at which a gear change is to be effected, then moving back up through the first stage or step of the clutch re-engagement cycle, and then finally moving back up through the second stage or step of the clutch re-engagement cycle to the driving position D. Following this curve in more detail, starting at the zero time position, in the fully engaged driving position D of the clutch, the servo 16 is fully relaxed, with the throttle displaced so that switch 77 is open and the solenoid valve 56 in its unenergized position of FIG. 2, and both the servo vacuum chamber 24 and the low vacuum chamber 84 at atmospheric pressure. Then, at the point 114 the throttle is released to its closed position so that the switch 77 is closed to energize the solenoid valve 56 to its position of FIG. 1 to connect high vacuum chamber 48 with servo vacuum chamber 24 so as to rapidly fully actuate servo 16 to the zero ordinate point 116 at which the clutch is fully disengaged. The steep slope of the curve between point 114 and point 116 represents the rapidity of this clutch disengagement actuation movement of servo 16. As long as the throttle remains closed so that the switch 77 is held closed, the servo 16 will remain in this fully actuated position. Then, after a gear change has been effected, and at a later time represented by the point 118 in FIG. 3, upon the first increment of throttle movement the switch 77 opens so as to de-energize solenoid valve 56 to the position of FIG. 2, thereby providing communication between the low vacuum chamber 84 and servo vacuum chamber 24 to commence the first stage or step of the clutch re-engagement cycle. The section of the curve between point 118 and point 120 represents this first stage or step of the clutch re-engagement cycle, and in FIG. 3 the point 120 has been placed on the first clutch contact line C indicating that the target for the first stage of the clutch re-engagement cycle has been exactly reached. The slope of the curve between point 118 and 120 represents the rate of the reduction from the high vacuum condition to a lower vacuum condition that is stabilized between servo vacuum chamber 24 and low vacuum chamber 84.

In the curve of FIG. 3 it has been assumed that the initial throttle increment which opened switch 77 was insufficient to open throttle valve 94, but that instantaneously upon completion of the first step of the clutch-re-engagement cycle the operator of the vehicle further displaces the throttle a fixed amount and maintains this displacement from the point 120 until the second stage or step of the clutch re-engagment cycle has been completed at the point 120 on the driving position line D, at which point the clutch is fully engaged. The slope of the curve between points 120 and 122 is determined by the adjustment of atmospheric pressure bleed orifice 111 and the amount of displacement of the throttle and thus of the valve element 103 in needle valve 94, and hence the rate at which atmospheric air is allowed to bleed into servo vacuum chamber 24 and low vacuum chamber 84.

Adjustment of the atmospheric pressure bleed orifice 111 to a more open position or an increase in throttle displacement will hasten the second stage of the clutch re-engagment cycle, as for example at a rate indicated by the steeper dotted line between the points 120 and 124. Conversely, adjustment of the bleed orifice 111 to a more constricted position or a smaller throttle displacement will slow down the second stage of the clutch re-engagement cycle, as for example to a rate indicated by the shallower slope of the dotted line between points 120 and 126.

The extent of the second stage re-engagement tolerance which is represented by the vertical spacing between the full clutch engagement line F and the driving position line D may be set by adjustment of the adjustable stop 41 on servo 16. Without the stop 41, the clutch springs would be enabled through the linkages 14 and 18 to move the servo actuator rod 36 through the entire excess displacement range to the position corresponding to the maximum possible movement or extension of clutch linkage 14, indicated by the phantom line M.

Figure 4:
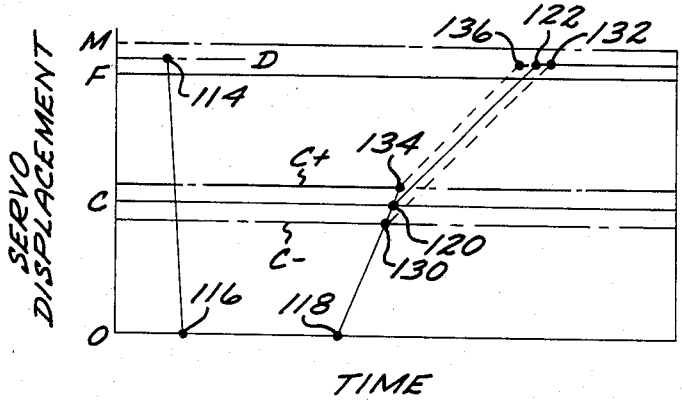
FIG. 4 is a graph similar to FIG. 3, but illustrating variations in the adjustment of the first stage of the clutch re-engagement cycle.

In FIG. 4 the solid line curve represented by the points 114, 116, 118, 120 and 122 is substantially the same as the solid line curve in FIG. 3, representing substantially the same rate of clutch disengagement between points 114 and 116; substantially the same time interval prior to initiating the first stage of the clutch re-engagement cycle at point 118; substantially the same rate of operation of the first stage between points 118 and 120; and substantially the same rate of operation of the second stage of the clutch re-engagement cycle between points 120 and 122. However, if the vacuum in low vacuum chamber 84 is somewhat higher (i.e., lower absolute pressure) than for the solid line curve of FIG. 3, then the first stage of the clutch re-engagement cycle will be completed before the first clutch contact position C of the servo 16 has been reached, as for example at the point 130 at which the clutch is slightly disengaged and in which there is zero torque transfer through the clutch. Then, assuming that the adjustable bleed orifice 111 and the throttle-controlled bleed valve 94 are opened the same amount as for the solid line curve section between points 120 and 122, the servo will allow the second stage of the clutch re-engagement cycle to occur at this same rate, represented by the same slope of the dotted line between points 130 and 132. On the other hand, if there is a somewhat lesser vacuum (higher absolute pressure) in the low vacuum chamber 84 than for the solid line curve in FIG. 3, then the first stage of the clutch re-engagement cycle will be completed after the first clutch contact position C of the servo has been passed through, as for example at the point 134 at which the clutch is slightly engaged, but at which there is still only a minimal torque transfer possible through the clutch. Then, assuming the same amount of opening of the adjustable bleed orifice 111 and the throttle-controlled bleed valve 94, the servo will again allow the second stage of the clutch re-engagement cycle to occur at the same rate as previously, represented by the same slope of the dotted line between points 134 and 136.

Figure 5:
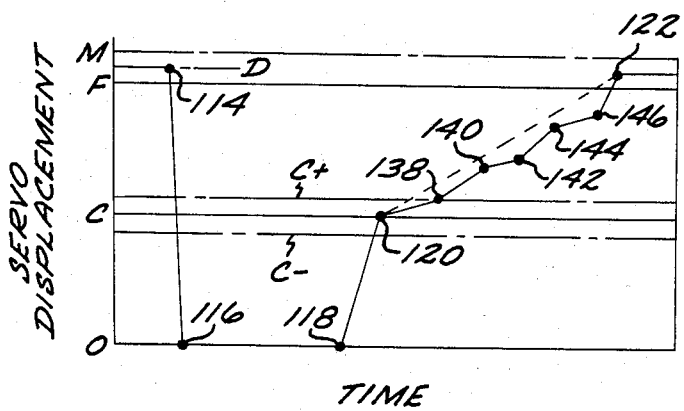
FIG. 5 is a graph similar to those of FIGS. 3 and 4, but with the curve in the region of the second stage of clutch re-engagement representing a throttle "teasing" action in which there is a series of different throttle positions from the closed position to a relatively widely displaced position.

The servo operation represented by the solid line curve in FIG. 5 is substantially the same as that represented by the solid line curve in FIG. 3 up to the point 120 at which the first stage of the clutch re-engagement cycle has become completed. However, in the operation of the invention illustrated in FIG. 5, the operator has allowed some time to pass from the completion of the first stage at point 120 before displacing the throttle more than was just necessary to open switch 77, and thereby displacing the throttle-controlled bleed valve 94, at the point 138. Thus, during the time between points 120 and 138 the atmospheric pressure bleed orifice 111 will allow the second re-engagement stage to commence at a relatively slow rate as indicated by the shallow slope of this segment of the curve. Then, from point 138 on, the solid line curve in FIG. 5 represents a throttle "teasing" action in which there is a series of different throttle positions from the almost closed position to a relatively widely displaced position. Thus, at point 138 the operator displaces the throttle a relatively small amount, for a relatively small interval of time, and then allows the throttle to almost close, this action being represented by the solid line curve section from point 138 to point 140. Then, during the interval of time between point 140 and point 142, the throttle is again almost closed so that there is slow clutch engagement movement of the servo allowed by the bleed orifice 111. Then at point 142, the throttle is displaced a relatively larger amount represented by the solid line curve section between points 142 and 144, and then the throttle is again nearly closed for an interval of time until the point 146 is reached. At point 146 the throttle is displaced an even larger amount than previously, causing a more rapid air bleed through throttle-controlled valve 94, and a more rapid rate of clutch re-engagement indicated by the increased slope of the curve section from point 148 to the fully engaged point 120.

Figure 6:
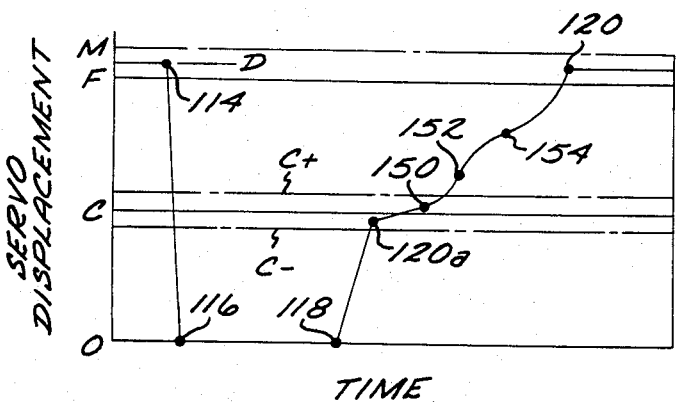
FIG. 6 is a graph similar to those in FIGS. 3-5, but with the portion of the curve representing the second stage of clutch re-engagement corresponding to a series of continuously varying throttle opening and closing movements.

In FIG. 6 the solid line curve is again substantially the same as that represented by the solid line curve in FIG. 3 up to the point at which the first stage of the clutch re-engagement cycle has become completed, except that in FIG. 6 the first stage completion point 120 is at a servo position within the first stage re-engagement tolerance slightly before the first clutch contact position C. FIG. 6 illustrates how continuously varying throttle positions affect the second stage of the clutch re-engagement cycle. As in the curve of FIG. 5, an interval of time has elapsed between point 120a and point 150 before the throttle is further displaced after its initial increment of movement which opens switch 77. Then, starting at point 150 throttle displacement is gradually increased up to the point 152, so that servo displacement representing clutch movement curves upwardly from point 150 to 152 at an increasingly steeper rate. Then, at point 152 throttle displacement is gradually decreased until the throttle is almost closed at point 154, so that the servo displacement curve gradually flattens out to the point 154, at which point the throttle displacement is again continuously increased until the servo has reached the point 120 of full clutch re-engagement.

FIGS. 7 and 8 illustrate a second form of the invention which produces the same results as the first form shown in FIGS. 1 and 2, but in a slightly simpler way. In the form shown in FIGS. 7 and 8, the low vacuum chamber 84a, which is defined within receptacle 83a, is still at atmospheric pressure at the commencement of a clutch re-engagement cycle from the venting of the servo to atmospheric pressure at the completion of the preceding clutch re-enagement cycle. Then, at the initiation of the first stage of the new clutch re-engagement cycle the secondary or low vacuum chamber 84a is placed in communication with the vacuum chamber 24 of servo 16 so as to dilute the high vacuum condition in servo chamber 24 to a low vacuum condition that will be balanced or equalized in both the servo chamber 24 and the low vacuum chamber 84a. The resulting low vacuum condition in the servo vacuum chamber 24 at the completion of the first stage of the clutch re-engagement cycle will be the same in the second form of the invention shown in FIGS. 7 and 8 as in the first form of the invention shown in FIGS. 1 and 2, with the target for the servo displacement as illustrated in FIGS. 3–6 being the first clutch contact position C, and within the first stage re-engagement tolerance span or range between the phantom lines C− and C+.

Structurally, the second form of the invention shown in FIGS. 7 and 8 is the same as the first form of the invention shown in FIGS. 1 and 2 and described in detail hereinabove, with only the following exceptions: (1) the low vacuum chamber 84a in the second form is smaller than the low vacuum chamber 84 in the first form; (2) the second form shown in FIGS. 7 and 8 completely omits the communication between the high vacuum portion of the system and the low vacuum chamber 84 in the form of FIGS. 1 and 2 for pre-establishing the low vacuum condition in chamber 84 during servo actuation, namely, the conduit 86 and adjustable pressure regulator valve 88 therein. Nevertheless, in the second form shown in FIGS. 7 and 8 the low vacuum condition for the first stage of the clutch re-engagement cycle is preselected, just as it is in the form of FIGS. 1 and 2, by the relative volumes and absolute pressures at the commencement of the first stage of the clutch re-engagement cycle of the servo vacuum chamber 24 and the low vacuum chamber 84a. (3) In the second form of the invention shown in FIGS. 7 and 8, adjustment of the preselected low vacuum condition in the servo vacuum chamber 24 and low vacuum chamber 84a may be affected by adjusting the volume of low vacuum chamber 84a by means of an adjustable wall 156 of the low vacuum chamber 84a. This adjustable wall 156 may be a piston in receptacle 83a, or alternatively may be an adjustable diaphragm (not shown). Adjustment of the volume of low vacuum chamber 84a in the form of FIGS. 7 and 8 produces the same result as adjustment of the pressure regulator valve 88 in the form of FIGS. 1 and 2, in adjusting the resulting low vacuum condition in servo vacuum chamber 24 at the completion of the first stage of the clutch re-engagement cycle, and hence adjustment of the servo displacement within the first stage re-engagement tolerance graphically illustrated in FIGS. 3–6.

The second form shown in FIGS. 7 and 8 is operated in the same way as the first form shown in FIGS. 1 and 2. The servo 16 operates the clutch through lost motion servo linkage 18, clutch pedal lever 10 and clutch linkage 14. High vacuum chamber 48 defined within receptacle 47 has the high vacuum condition established therein from the vacuum source through conduit 50 and pressure regulator check valve 52. Actuation of servo 16 to its full clutch disengagement position is effected by application of high vacuum from chamber 48 through conduit 54, solenoid-actuated valve 56 in its energized position of FIG. 7, and conduit 58 to servo vacuum chamber 24. Energization of solenoid valve 56 to move its valve element 62 to the high vacuum position shown in FIG. 7 against the force of spring 70 is effected by releasing throttle member 110, which automatically closes switch 77 to close the electrical circuit of solenoid coil 72 which includes battery 74, conductors 75 and 76, and switch 77 to ground.

To effect the first stage or step of the clutch re-engagement cycle, switch 77 is opened by initiation of throttle movement to de-energize the solenoid coil 72 and allow spring 70 to move valve element 62 to its low vacuum position as shown in FIG. 8, in which it closes off the high vacuum conduit 54 and provides communication from low vacuum chamber 84a through conduit 90a, valve 56 and conduit 58 to the servo vacuum chamber 24.

The second stage of the clutch re-engagement cycle is then effected by slow bleeding of atmospheric pressure through adjustable bleed orifice 111a to chamber 84a through conduit 90a and to servo chamber 24 through conduit 90a, solenoid valve 56 and conduit 58; and by displacement of throttle member 110 and corresponding displacement of throttle-controlled atmospheric pressure bleed valve 94 to allow air to bleed through conduits 99 and 58 to servo vacuum chamber 24, and through conduits 99 and 58, valve 56 and conduit 90a to low vacuum chamber 84a. This stage of the clutch re-engagement cycle is completed when both the servo vacuum chamber 24 and the low vacuum chamber 84a are at atmospheric pressure. The system of FIGS. 7 and 8 is at this time ready for another complete clutch actuation cycle.

FIGS. 9-13 illustrate a third form of the present invention, in which the clutch re-engagement control low vacuum chamber 84b defined within receptacle 83b remains during all phases of operation of the system at a low vacuum because of continuous communication through a pressure regulator valve with the high vacuum chamber 48a defined within receptacle 47a. At the commencement of the first stage of the clutch re-engagement cycle, when the low vacuum chamber 84b is valved into communication with the servo vacuum chamber 24, there will be a momentary reduction of the vacuum condition (raising of the absolute pressure) in low vacuum chamber 84b, but the continuous regulated communication of low vacuum chamber 84b with high vacuum chamber 84a will stabilize the low vacuum condition in chamber 84b to its original value by the time the servo displacement has reached the first stage re-engagement tolerance span or range between the phantom lines C— and C+ in FIGS. 3-6 and the first stage of the re-engagement cycle has been completed. Thus, in this third form of the invention shown in FIGS. 9-13 the preselected and pre-established low vacuum condition in chamber 84b will be the same as the low vacuum condition in vacuum chamber 24 of servo 16 at the completion of the first stage of the re-engagement cycle; whereas in each of the first two forms of the invention shown respectively in FIGS. 1 and 2 and 7 and 8 the initial vacuum or pressure condition in the respective low vacuum chamber 84 or 84a will differ from the final low vacuum condition in servo vacuum chamber 24 at the completion of the first stage of the re-engagement cycle.

Structurally, the third form shown in FIGS. 9-13 is the same as the first form of FIGS. 1 and 2, except for the following differences: (1) In the third form of FIGS. 9-13 conduit 86a and pressure regulator check valve 88a are continuously connected between high vacuum chamber 48a and low vacuum chamber 84b, rather than only being connected when the high vacuum chamber is in communication with the servo vacuum chamber as in the first form of FIGS. 1 and 2; (2) the solenoid valve 56a in the third form of FIGS. 9-13 is a three-position valve, with its third position variable by a cam, as compared to the simpler two-position solenoid valve 56 in the first form of FIGS. 1 and 2; (3) the throttle-controlled atmospheric pressure bleed portion of the system in the third form of FIGS. 9-13 employs the valve element 62a of the solenoid actuated valve 56a in the variable third position of the solenoid valve 56a with a throttle displacement-controlled cam 162 varying the third valve position with the valve element 62a operating as a cam follower, to provide proportional atmospheric pressure bleed-in to the servo vacuum chamber 24.

As in the other two forms of the invention, in the third form of FIGS. 9-13 the servo 16 controls clutch movement through lost motion servo linkage 18, clutch pedal lever 10 and clutch linkage 14. High vacuum storage chamber 48a defined within receptacle 47a is continuously maintained in its high vacuum condition from the vacuum source through conduit 50a and pressure regulator check valve 52a. In the energized position of solenoid actuated valve 52a as illustrated in FIG. 9, high vacuum chamber 48a communicates through conduit 54a, valve port 64a, annular groove 62b in valve element 62a, and conduit 58a to servo vacuum chamber 24 for actuation of servo 16 to the full clutch disengagement position. This energization of solenoid valve 56a is accomplished by closing the switch 77b when the throttle member 110a is released to close the electrical circuit for solenoid coil 72a which includes battery 74a, conductors 75a and 76a, and switch 77b to ground.

Switch 77b is opened upon initial displacement of throttle member 110a to initiate the first stage of the clutch re-engagement cycle, releasing the solenoid 68a and enabling spring 70a to move valve element 62a to its position illustrated in FIG. 10. This position of the solenoid valve 56a is defined by abutment of the valve element 62a against a valve stop shoulder 168 on throttle-controlled cam member 162. At this time the cam member 162 is biased by cam spring 166 to its fully extended position which corresponds to the closed, undisplaced position of throttle member 110a. In the first re-engagement stage position of FIG. 10, the low vacuum chamber 84b is placed in communication with servo vacuum chamber 24 through conduit 90b, low vacuum port 66a of solenoid valve 56a, annular groove 62b in valve element 62a, conduit 160 and conduit 58a.

After completion of the first stage of the clutch re-engagement cycle illustrated in FIG. 10, the second stage of the re-engagement cycle, which is illustrated in FIG. 11, is initated by slow bleeding of atmospheric pressure through adjustable orifice 111b, and by further displacement of throttle member 110a, and corresponding initial retraction displacement of cam member 162 which is operatively connected to throttle member 110a by means of cable 106a and throttle linkage member 108a. This first increment of retraction movement of cam member 162 moves its valve stop shoulder 168 out from behind solenoid valve element 62a, enabling the spring 70a to instantaneously shift the valve element 62a to its position of FIG. 11 at which it is stopped by the upper end of an inclined cam surface 170 on cam member 162. In this stopped position of valve element 62a shown in FIG. 11, the valve element 62a blocks off communication to servo vacuum chamber 24 from both the high vacuum chamber 48a and the low vacuum chamber 84b, and the annular groove 62b in valve element 62a is placed immediately adjacent atmospheric pressure bleed port 98a in valve 56a.

Summarizing the positions of valve element 62 in FIGS. 9, 10 and 11, respectively, in FIG. 9, the valve element 62a provides communication between high vacuum chamber 48a and servo vacuum chamber 24, but blocks off from communication with servo vacuum chamber 24 both the low vacuum chamber 84b and the atmospheric pressure bleed-in port 98a; in FIG. 10 the valve element 62a establishes communication between low vacuum chamber 84b and servo vacuum chamber 24, while blocking from the servo vacuum chamber 24 any communication with either the high vacuum chamber 48a or the atmospheric pressure bleed-in port 98a; and in the position of valve element 62a shown in FIG. 11, the valve element 62a seals off communication of servo vacuum chamber 24 with any of the three vacuum or pressure sources, including high vacuum chamber 48a, low vacuum chamber 84b and atmospheric pressure bleed-in port 98a. In the position of valve element 62a in FIG. 11, the low vacuum condition is retained in the servo vacuum chamber 24 that was established in the FIG. 10 position of valve element 62a.

FIGS. 12 and 13 illustrate atmospheric pressure bleed-in to servo vacuum chamber 24 resulting from further displacement of throttle member 110a and its connected cam member 162 from their initially displaced positions illustrated in FIG. 11. In FIG. 12, the cam member 162 has been displaced sufficiently for valve element 62a to have moved down the inclined cam surface 170 to a position in which air at atmospheric pressure is enabled to bleed through air filter 102a, atmospheric pressure conduit 100a, bleed port 98a, annular groove 62b on valve element 62a, conduit 99a and then conduit 58a to servo vacuum chamber 24. The extent of displacement of the throttle-controlled cam member 162 from its position of FIG. 11 will determine the rate at which atmospheric air will be enabled to bleed into the servo vacuum chamber 24, and hence the rate at which the second stage of the clutch re-engagement cycle is effected. Upon displacement of throttle member 110a and cam 162 a sufficient amount, the free end 172 of cam member 162 will be withdrawn out of the path of valve element 62a, enabling spring 70a to seat valve element 62a against cam guide 164, as shown in FIG. 13. In this position of valve element 62 it secures cam member 162 laterally in an inoperative position, in which cam member 162 will remain until the next complete clutch actuation cycle is initiated by closing of the switch 77b to withdraw the valve element 62a back to the position shown in FIG. 9. In the position of valve element 62a shown in FIG. 13, there is relatively free communication of atmospheric pressure through the valve 56a to servo vacuum chamber 24, and the second stage of the re-engagement cycle will have been completed.

This third form of the invention does not have the advantage of the extra volume of the secondary, low vacuum chamber to bleed to atmospheric pressure for increased control of the second re-engagement stage. Also, in this form the adjustable atmospheric pressure bleed orifice 111b is solely for the purpose of preventing inadvertent buildup of too high a vacuum in chamber 84b due to a possible fault in either of the valves 56a or 88a.

Each of the three forms of the invention may be readily adapted for use in connection with an air pressure source by the simple expedient of reversing two or three parts of the apparatus, depending upon which form of the invention is being adapted to pressure. Thus, in the form of FIG. 1, adaptation to a pressure source instead of a vacuum source is accomplished by reversing each of the check valves 52 and 88 in their respective conduits 50 and 86, and reversing the servo 16 by sealing the pressure chamber 26, opening the vacuum chamber 24, and connecting the conduit 58 to the pressure chamber 26. With the check valve 52 reversed so that its valve element faces toward the pressure source instead of the chamber 48, high pressure will be established in chamber 48, and upon energization of the solenoid valve 56, such high pressure will be communicated to pressure chamber 26 of servo 16 to actuate the clutch to its fully disengaged position. At the same time, with the pressure regulator valve 88 reversed so that its valve element faces toward the high pressure source, low pressure will be established through conduit 86 in the chamber 84, and upon release of the solenoid valve 56 to the position of FIG. 2, this low pressure will be communicated to the pressure chamber 26 of servo 16 to effect the first stage of the clutch re-engagement cycle. The second stage of the clutch re-engagement cycle will be effected by the adjustable orifice 111 and the throttle-controlled valve 94, which will bleed the pressure out of servo chamber 26 to atmosphere.

Similarly in the second form of the invention shown in FIGS. 7 and 8, with air pressure applied to conduit 50 instead of vacuum, the reversed check valve 52 will establish pressure in primary chamber 48, and this will be communicated upon energization of solenoid valve 56 to the position of FIG. 7 to the pressure chamber 26 of reversed servo 16 to cause full disengagement of the clutch. At this time the secondary chamber 84a will be at atmospheric pressure. Then, upon release of the solenoid valve 56 to the position of FIG. 8 to initiate the first stage of the clutch re-engagement cycle, air will be enabled to flow from the servo pressure chamber 26 to the secondary chamber 84a, thus diluting or reducing the pressure in servo chamber 26 to effect the first stage of the clutch re-engagement cycle. Then, such pressure will be bled by the adjustable orifice 111 and the throttle-controlled valve 94 from servo pressure chamber 26 and secondary chamber 84a to atmosphere to effect the second stage of the clutch re-engagement cycle.

Similarly, in the form of the invention shown in FIGS. 9-13, pressure will be established in the primary storage chamber 48a from a pressure source through conduit 50a and reversed check valve 52a. Lower pressure will be maintained in the secondary storage chamber 84a through conduit 86a and reversed check valve 88a from primary chamber 48a. In the energized position of solenoid valve 56a shown in FIG. 9, high pressure will be communicated from primary chamber 48a to pressure chamber 26 of the reversed servo 16 to fully disengage the clutch. At this time, secondary chamber 84b will be at atmospheric pressure. Then, upon release of the solenoid valve 56a to the position of FIG. 10, communication between pressure chamber 26 of reversed servo 16 and secondary chamber 84b will allow partial depressurization of servo chamber 26 to effect the first stage of the clutch re-engagement cycle. Then, the throttle-controlled cam member 162 will enable the servo pressure chamber 26 and secondary storage chamber 84b to bleed to atmosphere through valve 56a in the positions of valve 56a illustrated in FIGS. 12 and 13, thereby effecting the second stage of the clutch re-engagement cycle.

In the vacuum forms of the invention, it is preferable to have a high vacuum storage chamber included as a part of the clutch actuating system of the present invention in order to provide capacity for several complete clutch actuating cycles after the engine has been shut down, and to assure adequately high vacuum where the source of vacuum is such as to produce a vacuum level generally in proportion to engine RPM, as for example where the source is a brake servo vacuum pump. Nevertheless, it is to be understood that a suitable high vacuum source that is reliably available during engine operating conditions when clutch actuation will be required may be directly connected to the clutch actuating system of the invention without the intervening presence of the high vacuum chamber. Such a reliable high vacuum source is the intake manifold of a gasoline engine vehicle, which provides a maximum vacuum proximate the engine idle operating condition, which is the operating condition of the engine that will normally be present when transmission shifting, and hence clutch actuation, will occur. If the primary vacuum chamber 48 is to be omitted from the forms shown in FIGS. 1 and 7, and the primary vacuum chamber 48a omitted from the form shown in FIG. 9, then the vacuum source conduit 50 or 50a will be connected directly to the respective high vacuum conduit 54 or 54a, preferably still retaining the check valve 52 or 52a as a protection for the system.

Similarly, if the invention is adapted for operation by air pressure as described hereinabove, it is to be understood that the primary chamber 48 or 48a may be omitted and the source conduit 50 or 50a connected directly to respective conduit 54 or 54a, preferably through reversed check valve 52 or 52a.

Tests conducted with a prototype of the present invention that was set up to be convertible between the first form of FIGS. 1 and 2 and the second form of FIGS. 7 and 8 showed that the invention will operate satisfactorily as to both the first and second stages of the clutch re-engagement cycle if the volume of the secondary, low vacuum chamber is from about 1.5 to about 4.5 times the volume of the servo vacuum chamber 24 (in the relaxed position of the servo with the clutch fully engaged). These tests also showed that this increase in the total volume available for bleeding to atmosphere in the range of from about 250% to about 550% of the volume of the servo vacuum chamber alone provides much greater control and less criticality of the second stage of the clutch re-engagement cycle than prior art systems which only have substantially the volume of the servo chamber to bleed to atmosphere, or only have a small air pressure volume in the back side of the servo to bleed to atmosphere.

Figure 14:
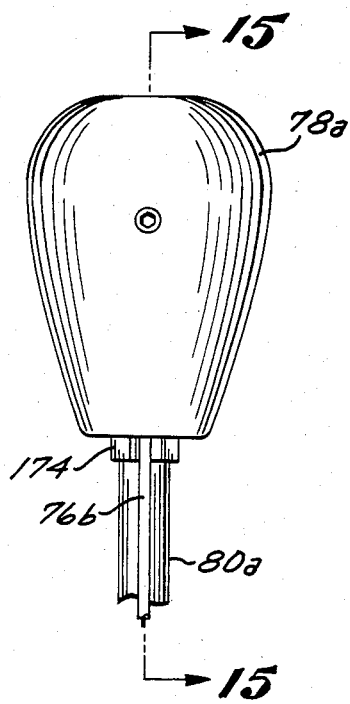
FIG. 14 is a side elevational view illustrating one form of gearshift knob tilt switch according to the invention.
Figure 15:
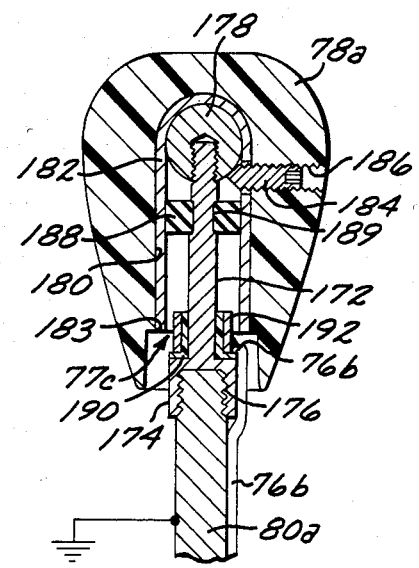
FIG. 15 is a vertical, axial section taken on the line 15—15 in FIG. 14.
Figure 16:
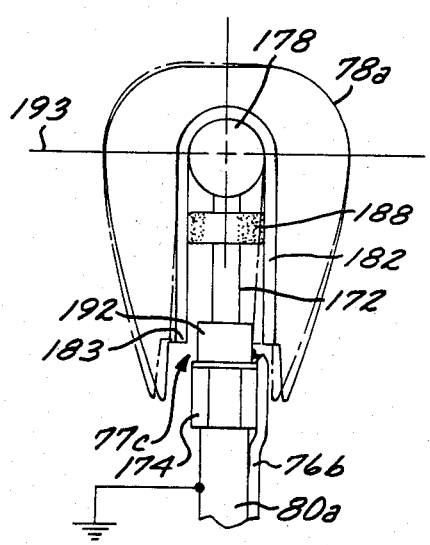
FIG. 16 is a diagrammatic side elevational view of the knob tilt switch in FIGS. 14 and 15 illustrating the tilting movement of the knob, the solid lines indicating the centered, open switch position of the knob, and the phantom lines indicating the tilted, closed switch position of the knob.

FIGS. 14-17 show a first form of knob switch 77c suitable for use in place of the knob 78 and its switch 77a shown in FIG. 1a. The knob 78a of FIGS. 14-16 differs in contour from the knob 78b in FIG. 17, and the mounting and switch components are more elongated in the knob 78a of FIGS. 14-16 than in the knob 78b of FIG. 17. Nevertheless, the arrangement of switch components is the same in the knob 78a of FIGS. 14-16 and the knob 78b in FIG. 17. Referring now to FIGS. 14-16, the gearshift knob 78a is mounted on the free end of electrically grounded gearshift lever 80a so that tilting of the knob 78a in any direction from its normally centered position coaxial with the longitudinal axis of gearshift lever 80a will close normally open electrical switch 77c and thereby actuate the servo 16 to completely disengage the clutch in any of the three forms of the invention shown in FIGS. 1-13.

A knob mounting post 172 has a hex nut 174 at one end thereof adapted for threaded engagement over the externally threaded free end 176 of lever 80a so that mounting post 172 is coaxial with lever 80a. A pivot ball 178 is mounted on the other, free end of mounting post 172. The mounting post 172 and the hex nut 174 and pivot ball 178 at its opposite ends are all electrically conductive so as to be grounded through the gearshift lever 80a. Thus, the mounting post 172 and its hex nut 174 constitute one terminal of the knob switch 77c.

The knob 78a has an axially centered, downwardly opening cavity 180 therein within which a complementary downwardly opening conductive socket 182 is disposed. Pivoting engagement of the upper end portion of conductive socket cup 182 against pivot ball 178 places the socket cup 182 at ground potential, and the lower end 183 of cup 182 constitutes the annular ground contact element of the switch 77c. A setscrew 184 is threadedly engaged within a radially directed, transverse passage 186 extending through the wall of knob 78a and through an aperture in socket cup 182. The passage 186 and setscrew 184 are axially displaced from the center of pivot ball 178 toward the base end of mounting post 172 which is connected to lever 80b, and the setscrew 184 projects radially inwardly beyond the wall of socket cup 182 so as to underlie the ball 178 and thereby secure the knob 78a and socket cup 182 in their operative, pivotal positions on the mounting post 172 and pivot ball 178.

A resilient annular centering ring 188 of elastomeric material is coaxially mounted in an annular groove 189 on mounting post 172. The resilient ring 188 is preferably compressively engaged between the post 172 and the socket cup 182, and the amount of this compression, the axial width of the ring 188, the nature of the elastomeric material in the ring 188, and the axial displacement of the ring 188 from the center of pivot ball 178 will all predetermine the amount of centering torque which the elastomeric ring 188 applies to the knob 78a, and hence the amount of manual tilting torque which must be applied to the knob 78a in order to close the normally open switch 77c.

An insulator grommet 190 covers the mounting post 172 proximate the hex nut 174 at its base, and conductive ring 192 is supported on insulator grommet 190 so as to be electrically insulated from the post 172. Conductor 76b is electrically connected to the conductive ring 192, preferably by soldering, and the insulated wire containing conductor 76b may then simply be run down the length of gearshift lever 80, and is connected to the solenoid coil 72 or 72a in each of the three embodiments of the invention shown in FIGS. 1-13. Thus, conductive ring 192 constitutes the other terminal of the knob switch 77c.

As best illustrated in FIG. 16, manual tilting of the knob 78a in any direction about the universal joint pivot between ball 178 and cup 182 will bring the annular ground contact 183 at the bottom of cup 182 into electrical contact with the annular ring contact 192 on the post 172 so as to complete the electrical circuit of the solenoid coil 72 or 72a and thereby cause actuation of the servo 16 to completely disengage the clutch in each of the three forms of the invention shown in FIGS. 1-13. Release of the knob 78a will allow the resilient annular ring 188 to instantaneously center the knob 78a so that it is again coaxial with the post 172 and lever 80a, thereby opening the switch 77c and initiating the first stage of the clutch re-engagement cycle by de-energizing the solenoid valve 56 or 56a of the three forms of the invention shown in FIGS. 1-13.

Figure 17:
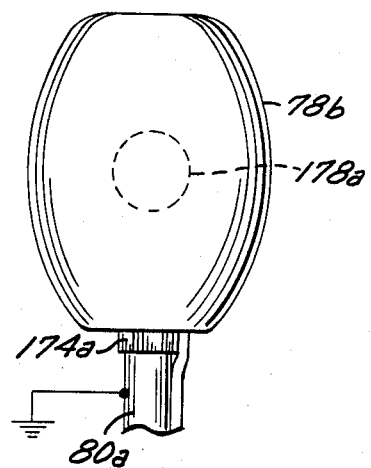
FIG. 17 is a side elevational view similar to FIG. 14 illustrating a modified knob configuration and pivot ball location for the same general form of knob switch as illustrated in FIGS. 14–16.

FIG. 16 illustrates a feature of the form of gearshift knob switch shown in FIGS. 14-17 which helps to prevent accidental closing of the switch 77c and consequent accidental actuation of the clutch servo 16. This feature is location of the pivot center of ball 178 in a transverse plane 193 (i.e., normal to the axis of post 172 and lever 80a) that is proximate the largest diameter portion of the knob. In the case of knob 78a in FIGS. 14-16, where the most bulbous or largest diameter portion of the knob is near its top, the pivot ball 178, and hence the transverse plane 193 through its center, will be located near the top of the knob. On the other hand, in the case of a gearshift knob 78b as shown in FIG. 17 which has its largest diameter part generally axially centered between the ends of the knob, the ball 178a will correspondingly be located proximate the axial center of the knob.

This feature of locating the pivot center in a transverse plane that is proximate the largest diameter portion of the knob will generally prevent accidental closing of the switch should the knee or leg of the driver or a passenger rest against the knob, inasmuch as lateral force applied by a knee or leg would be most likely to be applied proximate the largest diameter portion of the knob and thereby generally in the direction of the plane 193 so that little or no tilting torque would be applied thereby to the knob.

This feature of axially locating the pivot ball proximate the largest diameter part of the knob requires deliberate manual tilting of the knob, rather than simply pushing or pulling against the largest diameter part of the knob in the direction of the next gear position. With such deliberate application of tilting torque to the knob, the knob will naturally be held in its tilted position with the knob switch maintained closed during the entire movement of the gearshift lever from one gear position through the neutral zone of the transmission to another gear position, which will minimize the number of switch opening and closing events. In contrast, gearshift knob switches are conventionally pivoted proximate the lower end or root of the knob for the purpose of enabling the knob switch to be closed by simply pushing or pulling against an enlarged upper end portion of the knob in the direction of the next gear position. However, with a knob switch that is operated in this intended manner, each time the gearshift lever passes through the neutral zone of the transmission, the lever half of the torque force couple is lost (the resistive force of the gearshift lever against the push or pull force by the operator on the knob is lost), so that the switch may momentarily open, and will then again be closed when the missing resistive force again comes into play as the lever is pushed out of the neutral zone into the next gear position. Thus, such conventional gearshift knob operation may involve many more switching events than the operation of the form of gearshift knob shown in FIGS. 14-17.

The form of gearshift knob switch illustrated in FIGS. 18-20 embodies pivotal mounting, biasing and contacting structures similar to those embodied in the form of knob switch shown in FIGS. 14-17 and described in detail hereinabove. However, these structures have been modified so as to position the ball and socket universal pivot proximate the base or root of the knob 78b, while the largest diameter or most bulbous part of the knob 78b is proximate its free or upper end. Thus, while the form of knob switch shown in FIGS. 18-20 embodies the novel features of mounting, biasing and contacting employed in the form of knob switch shown in FIGS. 14-17, it may be operated in the conventional manner by pushing or pulling against the enlarged head part of the knob 78b in the direction of the next gear position, and this will apply the tilting torque required to close the switch 77d. The knob 78c is mounted on the upper end of gearshift lever 80b by means of knob mounting post 172a. Mounting post 172a embodies downwardly opening hex nut 174a at its lower or root end for threaded connection with the threaded upper or free end 176 of gearshift lever 80b. In this form of the gearshift knob switch the pivot ball 178a is not mounted at the upper or free end of the mounting post, but instead at a location intermediate the end portions of the mounting post 172a, as by means of threaded engagement. Mounting post 172a and its hex nut constitute one terminal of knob switch 77d.

The knob 78b has axially located, downwardly opening cavity 180a therein, within which downwardly opening conductive socket cup 182a is located. The upper end of socket cup 182a is formed as a partial hemispheric section complementary to the surface of pivot ball 178a to provide the universal ball and socket joint, and both the knob 78b and conductive socket cup 182a are retained in their operative, mounted positions by transverse, radially directed setscrew 184a which is threadedly engaged in radial passage 186a extending through the walls of knob 78b and socket cup 182a, the setscrew 184a being axially displaced below the center of the ball 178a to effect the retention.

Conductive socket cup 182a has an axial opening 194 in the top thereof through which the mounting post 172a projects, and the cup 182a also has a radially outwardly directed annular flange or skirt 196 at its lower edge which underlies the lower or root end of knob 78b. The flange or skirt 196 constitutes the annular ground contact of switch 77d, the ground connection for annular contact 196 being through the conductive socket cup 182a, conductive pivot ball 178a, mounting post 172a, hex nut 174a and the electrically grounded gearshift lever 80b.

In this form of gearshift knob switch according to the invention, the resilient annular centering ring 188a of elastomeric material is mounted on a reduced upper end portion 198 of mounting post 172a and retained in this position by means of a nut 200 threadedly engaged on the reduced upper portion 198 of the mounting post above resilient centering ring 188a.

As a support for the "hot" annular contact of the switch 77d, an annular flange 202 is provided on the nut portion 178a of knob mounting post 172a, the flange 202 preferably being co-extensive with the ground contact flange 196. A flat annular ring 204 of electrical insulation material is coaxially supported on the upper surface of flange 202, and flat annular ring 206 of electrical conducting material is coaxially supported on the upper surface of insulator ring 204.

The flange 202 has a radial cutout or recess 208 therein to provide space for an electrically conductive tab 210 to extend generally axially downwardly from the inner edge of conductive ring 206 for electrical connection of the conductive ring 206 to conductor 76c from the solenoid coil 72 or 72a of any of the three forms of the invention shown in FIGS. 1-13. The conductive tab 210 is readily accessible for soldered connection to the conductor 76c. Preferably, a layer 212 of insulation material covers the face of hex nut 174a that underlies conductive tab 210 and conductor 76c, so as to prevent accidental grounding of these "hot" conductive members. Thus, conductive contact ring 206 and its tab 210 constitute the other terminal of knob switch 77d.

As can be best visualized from FIG. 20, although the ball and socket universal pivot joint provided by pivot ball 178a and socket cup 182a are located proximate the base or root end of gearshift knob 78b, the radially outwardly projecting ground conductor flange or skirt 196 and the radially coextensive "hot" conductor 206 provide sufficient contact spacing from the center of the pivot ball 178a so that a relatively small amount of tilting movement of the knob 78b will close the switch 77d, as indicated by the tilted phantom line position of knob 78b at which electrical contact is made in the switch 77d.

Both the form of knob switch shown in FIGS. 14-17 and the form shown in FIGS. 18-20 have the following novel features in common: (1) Both forms employ a ball and socket pivot for universal or 360° tiltability in any lateral direction for closing the switch. Tilting in all directions is made uniform and easy by positioning of the ball and socket pivot on the longitudinal axial center of the gearshift lever and knob. (2) In both forms a knob mounting post of simple configuration serves the multiple purposes of providing threaded connection for the knob to the threaded free or upper end of any gearshift lever, supporting the pivot ball, supporting a resilient annular centering ring, and supporting a "hot" contact ring that is readily accessible for electrical connection to a lead that may be conveniently brought up along the side of the gearshift lever. (3) In both forms of the knob switch this "hot" contact ring is electrically insulated from the gearshift lever, permitting the lever itself to be conveniently employed in a simplified ground circuit that employs the socket part of the pivotal mounting to conduct from the grounded pivot ball to a ground contact ring that may simply be an integral part of the socket. (4) The resilient annular centering ring biases directly in the direction of a plane transverse to the longitudinal axis of the gearshift lever and the knob switch, for maximum biasing efficiency and uniformity throughout 360°.

While the instant invention has been shown and described herein in what are conceived to be the most practical and preferred embodiments, it is recognised that departures may be made therefrom within the scope of the invention.

I claim:

1. A method for actuating a normally engaged clutch of a manual transmission type vehicle, which comprises:
    applying a first pressure level that is different than atmospheric pressure to a pressure differential operated clutch servo to cause said servo to disengage said clutch;
    establishing a second pressure level in clutch re-engagement control chamber means;
    substantially simultaneously cutting off said application of said first pressure level to said servo and placing said control chamber means and its second pressure level in communication with said servo so as to allow partial release of said first pressure level into said control chamber and thereby effect a first stage of clutch re-engagement; and
    venting said servo to atmospheric pressure so as to allow complete release of said first pressure level from said servo and thereby allow said clutch to become fully re-engaged.

2. The method of claim 1, wherein said first pressure level is below atmospheric pressure.

3. The method of claim 1, wherein said first pressure level is above atmospheric pressure.

4. The method of claim 1, wherein said second pressure level is intermediate said first pressure level and atmospheric pressure.

5. The method of claim 4, wherein said second pressure level is established by applying said first pressure level through pressure regulator means to said control chamber means during the time said first pressure level is applied to said servo to cause clutch disengagement.

6. The method of claim 1, wherein said second pressure level is substantially atmospheric pressure.

7. The method of claim 6, wherein said second pressure level is established by venting said control chamber means to atmospheric pressure during said venting step.

8. The method of claim 1, wherein said venting step comprises venting both said servo and said control chamber means to atmosphere.

9. The method of claims 1 or 8, wherein said venting step comprises venting through orifice means that is variable according to throttle displacement.

10. The method of claims 1 or 8, wherein said venting step comprises venting through orifice means that is not variable according to throttle displacement.

11. The method of claims 1 or 8, wherein said venting step comprises both venting through orifice means that is variable according to throttle displacement and venting through orifice means that is not variable according to throttle displacement.

12. The method of claims 1 or 8, wherein said servo comprises actuating chamber means to which said first pressure level is applied and with which said control chamber means is placed in communication, and said control chamber means has a volume at least about 1½ times the volume of said actuating chamber means when said first pressure level has been fully released from said actuating chamber means.

13. The method of claim 12, wherein the volume of said control chamber means is not more than about 4½ times said volume of said actuating chamber means.

14. The method of claim 1, which comprises initiating said first stage of clutch re-engagement automatically in response to the initial displacement movement of a throttle member from its closed throttle position.

15. The method of claim 1, which comprises initiating said first stage of clutch re-engagement in response to movement of a tiltable gearshift knob.

16. A system for actuating a normally engaged clutch of a manual transmission type vehicle, which comprises:
   a pressure differential operated clutch servo connected for disengaging said clutch upon application to said servo of a first pressure level that is different than atmospheric pressure, for allowing a first stage of clutch re-engagement upon partial release of said first pressure level from said servo, and for allowing said clutch to become fully re-engaged upon complete release of said first pressure level from said servo;
   a source of said first pressure level;
   clutch re-engagement control chamber means;
   means for establishing a second pressure level in said control chamber means at least during the time that said first pressure level is applied to said servo and said clutch is disengaged;
   electrically operable valve means fluid-connected to said servo, to said source, and to said control chamber means;
   said valve means having an energized position in which it connects said servo to said source to disengage the clutch, but disconnects said servo from said control chamber means;
   said valve means having a de-energized position in which it disconnects said servo from said source and connects said servo to said control chamber means to allow partial release of said first pressure level into said control chamber means and thereby effect said first stage of clutch re-engagement; and
   means for venting said servo to atmospheric pressure to allow complete release of said first pressure level from said servo and thereby allow said clutch to become fully re-engaged.

17. A system as defined in claim 16, wherein said first pressure level is below atmospheric pressure.

18. A system as defined in claim 16, wherein said first pressure level is above atmospheric pressure.

19. A system as defined in claim 16, wherein said second pressure level is intermediate said first pressure level and atmospheric pressure.

20. A system as defined in claim 19, wherein said means for establishing said second pressure level in said control chamber means comprises a fluid connection having pressure regulator means therein from said valve means to said control chamber means, such communication establishing said second pressure level in said control chamber means each time said valve means is energized to connect said servo to said source so as to disengage the clutch, thus preparing said control chamber means for effecting said first stage of clutch re-engagement upon de-energization of said valve means to disconnect said servo from said source and connect said servo to said control chamber means.

21. A system as defined in claim 16, wherein said second pressure level is substantially atmospheric pressure.

22. A system as defined in claim 21, wherein said means for establishing said second pressure level in said control chamber means comprises said venting means.

23. A system as defined in claim 16, wherein said source of said first pressure level comprises storage chamber means.

24. A system as defined in claim 16, wherein said venting means is operable in said de-energized position of said valve means to simultaneously vent both said servo and the additional volume of said control chamber means to atmosphere.

25. A system as defined in claims 16 or 24, wherein said venting means comprises variable aperture throttle-controlled bleed valve means.

26. A system as defined in claims 16 or 24, wherein said venting means comprises bleed orifice means.

27. A system as defined in claim 26, wherein said orifice means is adjustable.

28. A system as defined in claims 16 or 24, wherein said venting means comprises both variable aperture throttle-controlled bleed valve means and bleed orifice means.

29. A system as defined in claims 16 or 24, wherein said servo comprises actuating chamber means, said fluid connection between said valve means and said servo is to said actuating chamber means, and said control chamber means has a volume at least about $1\frac{1}{2}$ times the volume of said actuating chamber means when said first pressure level has been fully released from said actuating chamber means.

30. A system as defined in claim 29, wherein the volume of said control chamber means is not more than about $4\frac{1}{2}$ times said volume of said actuating chamber means.

31. A system as defined in claim 16, which comprises electrical switch means electrically connected to said electrically operable valve means, said switch means having an open position in which said valve means is de-energized and a closed position in which said valve means is energized.

32. A system as defined in claim 31, wherein said switch means is operatively associated with a throttle member so as to be automatically closed to energize said valve means and automatically cause clutch disengagement upon closing of said throttle member, and to be automatically opened to de-energize said valve means and automatically effect said first stage of clutch re-engagement upon initial opening movement of said throttle member.

33. A system as defined in claim 31, wherein said switch means comprises gearshift knob tilt switch means.

34. A system as defined in claim 33, wherein said knob tilt switch means comprises:
   an electrically conductive mounting post adapted to be rigidly mechanically connected to the free end of a gearshift lever so as to form an extension of the lever, said post comprising one electrical terminal of the switch;
   an electrically conductive pivot ball mounted on said post in electrically conducting relationship with said post;
   a first annular contact mounted on said post in electrically insulated relation to said post, said first annular contact comprising another electrical terminal of the switch;
   a gearshift knob member having upper and lower ends and having a downwardly opening, electrically conductive cup member therein, said cup member comprising a socket at its upper end pivotally seated in electrically conducting relationship over said pivot ball and comprising a second annular contact proximate its lower end annularly facing said first contact; and
   a resilient annular centering ring engaged between said post and one of said members for normally biasing said knob into a centered position on said post with said contacts spaced apart, tilting of said knob in any direction relative to said post causing said contacts to engage and close an electrical circuit between said terminals, thereby energizing said valve means.

35. A system as defined in claim 34, wherein said mounting post terminal of the switch means is adapted to be in electrically conducting relationship with an electrically grounded gearshift lever.

36. A system as defined in claim 34, wherein said knob has a most bulbous portion proximate its upper end, and wherein said pivot ball and socket are located proximate the lower end of the knob, whereby gear shifting force on said bulbous upper end portion of the knob will automatically tilt the knob and close the switch means so as to automatically energize said valve means and automatically cause clutch disengagement, and release of said gear shifting force will automatically allow the knob to become centered with said contacts spaced apart so as to aytomatically de-energize said valve means and automatically effect said first stage of clutch re-engagement.

37. A system as defined in claim 34, wherein said knob has a most bulbous portion at a location intermediate the ends of the knob, and wherein said pivot ball and socket are located proximate said bulbous portion to minimize accidental tilting of the knob and closing of the switch means resulting from inadvertent lateral forces against said bulbous portion of the knob.

38. A gearshift knob tilt switch which comprises:
an electrically conductive mounting post adapted to be rigidly mechanically connected to the free end of a gearshift lever so as to form an extension of the lever, said post comprising one electrical terminal of the switch;
an electrically conductive pivot ball mounted on said post in electrically conducting relationship with said post;
a first annular contact mounted on said post in electrically insulated relation to said post, said first annular contact comprising another electrical terminal of the switch;
a gearshift knob member having upper and lower ends and having a downwardly opening, electrically conductive cup member therein, said cup member comprising a socket at its upper end pivotally seated in electrically conducting relationship over said pivot ball and comprising a second annular contact proximate its lower end annularly facing said first contact; and
a resilient annular centering ring engaged between said post and one of said members for normally biasing said knob into a centered position on said post with said contacts spaced apart, tilting of said knob in any direction relative to said post causing said contacts to engage and close an electrical circuit between said terminals.

39. A gearshift knob tilt switch as defined in claim 38, wherein said mounting post is adapted to be in electrically conducting relationship with an electrically grounded gearshift lever, so that said switch is a grounding switch.

40. A gearshift knob tilt switch as defined in claim 38, wherein said knob has a most bulbous portion proximate its upper end, and wherein said pivot ball and socket are located proximate the lower end of the knob, whereby gear shifting force applied against said bulbous portion of the knob will automatically tilt the knob and close the switch.

41. A gearshift knob tilt switch as defined in claim 38, wherein said knob has a most bulbous portion at a location intermediate the ends of the knob, and wherein said pivot ball and socket are located proximate said bulbous portion to minimize accidental tilting of the knob and closing of the switch resulting from inadvertent lateral forces against said bulbous portion of the knob.

* * * * *